(12) United States Patent
Käding

(10) Patent No.: US 10,169,049 B2
(45) Date of Patent: Jan. 1, 2019

(54) APPLICATION SYSTEM INDEPENDENT DYNAMIC PROCESS ORIENTED HELP

(71) Applicant: Software AG, Darmstadt (DE)

(72) Inventor: Michael Käding, St.Ingbert (DE)

(73) Assignee: Software AG, Darmstadt (DE)

( * ) Notice: Subject to any disclaimer, the term of this patent is extended or adjusted under 35 U.S.C. 154(b) by 976 days.

(21) Appl. No.: 14/161,329

(22) Filed: Jan. 22, 2014

(65) Prior Publication Data
US 2015/0205621 A1 Jul. 23, 2015

(51) Int. Cl.
G06F 9/451 (2018.01)
G06F 3/0484 (2013.01)
G06F 9/44 (2018.01)

(52) U.S. Cl.
CPC ........ G06F 9/4446 (2013.01); G06F 3/04842 (2013.01); G06F 9/453 (2018.02)

(58) Field of Classification Search
CPC .... G06Q 10/067; G06Q 10/06; G06Q 10/103; G06F 9/4446; G06F 9/453; G06F 3/04842
See application file for complete search history.

(56) References Cited

U.S. PATENT DOCUMENTS 5,872,915 A * 2/1999 Dykes ............... G06F 21/41
726/5
6,098,081 A * 8/2000 Heidorn ............ G06F 17/30014
707/999.003
8,099,664 B2 1/2012 Kureshy et al.
2002/0035478 A1 * 3/2002 Levitt ............... G06F 9/4446
434/107
2006/0059253 A1 * 3/2006 Goodman ........... G06Q 10/10
709/223
2006/0074726 A1 * 4/2006 Forbes ............ G06Q 10/0637
705/7.36
2006/0235736 A1 * 10/2006 Guckenheimer ..... G06F 9/4446
715/708

(Continued)

OTHER PUBLICATIONS

SAP community network. SCN. [Online] (printed Jan. 28, 2014) <http://wiki.scn.sap.com/wiki/display/ModHandbook/Business+Process+Repository+in+SAP+Solution+Manager>.

(Continued)

*Primary Examiner* — Amy Ng
*Assistant Examiner* — William Wong
(74) *Attorney, Agent, or Firm* — Posz Law Group, PLC

(57) ABSTRACT

Dynamic help is generated for a process which is defined by a process model definition stored in a repository. A help request triggers help, and identifies an application system for which help is requested. The application system is in a repository which provides an API that navigates and accesses contained objects and process model definitions in the repository. The processor determines, in response to the help request, which of configurations stored in a dynamic process help generator (DPHG) storage to use to provide help, based on the application system of the help request. The processor obtains, from that configuration, information indicating relations of the repository related to the application system, process models and objects. The processor requests, via the repository API, the process models and objects based on the information obtained from that configuration. The processor provides, as a response to the help request, the relations, process models and objects.

20 Claims, 23 Drawing Sheets

(56) References Cited

U.S. PATENT DOCUMENTS

| | | | |
|---|---|---|---|
| 2006/0277468 A1 | 12/2006 | Sapir | |
| 2007/0220428 A1* | 9/2007 | Kureshy | G06F 9/4446 715/708 |
| 2008/0065668 A1* | 3/2008 | Spence | G06F 9/4446 |
| 2009/0037237 A1* | 2/2009 | Weber | G06Q 10/06 705/7.11 |
| 2009/0063221 A1* | 3/2009 | Jonath | G06Q 10/06393 705/7.39 |
| 2009/0077502 A1 | 3/2009 | Bird et al. | |
| 2009/0204467 A1* | 8/2009 | Rubio | G06F 8/36 705/7.27 |
| 2010/0262557 A1* | 10/2010 | Ferreira | G06Q 10/06 705/348 |
| 2010/0325557 A1* | 12/2010 | Sibillo | G06F 3/0481 715/751 |
| 2011/0307780 A1 | 12/2011 | Harris et al. | |
| 2012/0029958 A1* | 2/2012 | Ayed | G06Q 10/06 705/7.11 |
| 2012/0029969 A1* | 2/2012 | Franke | G06Q 10/06 705/7.28 |
| 2013/0159199 A1* | 6/2013 | Keil | G06Q 10/06 705/304 |
| 2013/0159907 A1* | 6/2013 | Brosche | G06Q 10/06 715/771 |

OTHER PUBLICATIONS

Object Management Group—UML. OMG. [Online] (updated Jan. 16, 2014) <http://www.uml.org/>.

Enterprise resource planning. Wikipedia. [Online] (updated Jan. 25, 2014) <http://en.wikipedia.org/wiki/Enterprise_resource_planning>.

SAP Business Management Software Solutions, Applications and Services | SAP. SAP. [Online] (printed Jan. 28, 2014) <http://www.sap.com>.

T-code. Wikipedia. [Online] (updated Jan. 3, 2014) <http://en.wikipedia.org/wiki/T-code>.

SAP Deutschland—Komponenten and Werkzeuge von SAP NetWeaver: SAP Solution Manager. SAP. [Online] (printed Jan. 28, 2014) <http://www.sap.com/germany/plattform/netweaver/components/solutionmanager/index.epx>.

Confluence—Team Collaboration Software | Atlassian. Atlassian. [Online] (printed Jan. 28, 2014) <https://www.atlassian.com/en/software/confluence>.

Creating OpenSearch plugins for Firefox | MDN. Mozilla. [Online] (printed Jan. 28, 2014) <https://developer.mozilla.org/en-US/docs/Creating_OpenSearch_plugins_for_Firefox>.

Extensible Markup Language (XML) 1.0 (Fifth Edition). W3C. [Online] [Cited: Mar. 31, 2011] <http://www.w3.org/TR/2008/REC-xml-20081126/>.

* cited by examiner

```xml
<?xml version="1.0" encoding="UTF-8"?>
<dphg>
    <applicationsystems>
        <aplicationsystem>
            <id>sap</id>
            <relations>
                <task_types>
                    <task_type type="SCREEN">
                        <attributes>
                            <attribute>TRANSACTIONCODE</attribute>
                        </attributes>
                    </task_type>
                </task_types>

<task2businessfunctions>
                    <task2businessfunction>
                        <step to="FUNCTION" connectionkind="CONNECTION" />
                    </task2businessfunction>

<task2businessfunction>
                        <step to="MODELS" connectionkind="OCCURRENCE">
                            <types>
                                <type>FUNCTION_ALLOCATION_DIAGRAMM</type>
                            </types>
                            <connectiontypes>
                                <!-- no restrictions regarding cxntypes / symboltypes-->
                            </connectiontypes>
                        </step>
                        <step to="FUNCTION" connectionkind="LINK" />
                    </task2businessfunction>
                </task2businessfunctions>

<helprelevantobjects...>
                <helprelevantmodels...>
            </relations>
        </aplicationsystem>
    </applicationsystems>
</dphg>
```

```xml
<?xml version="1.0" encoding="UTF-8"?>
<dphg>
    <applicationsystems>
        <aplicationsystem>
            <id>sap</id>
            <relations>
                <task_types...>
                <task2businessfunctions...>
                <helprelevantobjects>
                    <businessfunctions2help>
                        <businessfunction2help>
                            <step to="INFORMATION_CARIER" connectionkind="CONNECTION" />
                        </businessfunction2help>
                        <businessfunction2help>
                            <step to="EVENT" connectionkind="CONNECTION" />
                        </businessfunctions2help>
                    </businessfunction2help>
                    <tasks2help>
                        <!-- no help directly assigned to tasks-->
                    </tasks2help>
                </helprelevantobjects>
                <helprelevantmodels>
                    <businessfunction2process>
                        <step to="MODELS" connectionkind="OCCURRENCE">
                            <types>
                                <type>EVENT_PROCESS_CHAIN</type>
                                <type>BPMN_PROCESS_DIAGRAM</type>
                            </types>
                        </step>
                    </businessfunction2process>
                    <task2process>
                        <step to="MODELS" connectionkind="OCCURRENCE">
                            <types>
                                <type>FUNCTION_ALLOCATION_DIAGRAM</type>
                            </types>
                        </step>
                    </task2process>
                </helprelevantmodels>
            </relations>
        </aplicationsystem>
    </applicationsystems>
</dphg>
```

901

FIG. 9 http://arisserver:arisport/connect?extension=DPHG&user=usertoken
&language=languageid&applsystem=applsystemid&task=taskid

FIG. 20

APPLICATION SYSTEM INDEPENDENT DYNAMIC PROCESS ORIENTED HELP

TECHNICAL FIELD

The technical field relates in general to software systems, and particularly to help processing for such systems.

BACKGROUND

Conventionally, advanced help systems use dedicated help repositories and/or databases that can be queried with explicit parameters. Such systems can return a previously prepared help text, pictures or the like in response to a request for help. In this situation, the help logic is programmed as such into the application, such as a business application. Examples of conventional systems represented by several patent documents are discussed below in this background section.

U.S. Pat. No. 8,099,664 to Kureshy, et al., concerns a system that embeds any kind of customized help data into an application systems help system. The customized/dynamic part is delivered by the application for which the help is requested. The help system itself might not be part of the application for which help is requested. The help system may be running inside the application. Nevertheless, Kureshy is about embedding any customized help into a distinct application, thereby yielding a static help system.

US 2009/0077502 to Bird, et al., relates to a help system where different text modules for objects are collected by relations between these objects. Objects and relations are defined in a model. The static help is generated from the model that collects objects and relations. The help is regenerated after an object is changed.

US 2006/0277468 to Sapir concerns embedded help or a context sensitive help. Static help content is placed in the right part of a distinct application.

US 2011/0307780 to Harris, et al., relates to a help system that adds Google search results by defining a mapping between the help request identifier and search queries.

There remains a need for a help system that is process oriented, is application system independent, and is up-to-date each time that the application changes.

SUMMARY

Accordingly, an embodiment provides a system, method and/or non-transitory computer readable medium for generating help for a process which is defined by a process model definition stored in a repository, the repository is accessed through an application programming interface (API). A processor receives a help request to trigger help, wherein the help request identifies an application system for which help is requested, wherein the application system is in a repository which provides an application programming interface (API) that navigates and accesses contained objects in the repository and process model definitions in the repository. The processor determines, in response to the help request, which configuration of a plurality of configurations stored in a dynamic process help generator (DPHG) storage to use to provide help, based on the application system identified in the help request. The processor obtains, from the determined configuration in the DPHG storage, information indicating relations of the repository related to the application system, and process models and objects of the repository for said relations. The processor requests, from the repository through the API of the repository, the process models and objects based on the information obtained from the determined configuration. The processor provides, as a response to the help request, the relations, and the process models and the objects which are received by the processor in response to the requesting.

In accordance with one or more embodiments, the providing of the response to the help request further includes the processor delivering to a renderer, the relations, and the process models and the objects which are received by the processor in response to the requesting; and formatting, in the renderer, a visualization of the relations, the process models and the objects, as the response to the help request.

In accordance with various embodiments, the repository is a business process repository (BPR) in which a plurality of application systems are stored, and the API provides access to the BPR; and the process models are business process models, and the objects further belong to the business process models.

In still another embodiment, the help request received by the processor to trigger help includes the identification of the repository, the application system, a task for which help is requested in the application system, and a user of the task that generated the help request.

In yet another embodiment, the response provided to the help request, indicates only the relations, and the plural process models and the plural objects that are relevant to the combination of the application system, the task, and the user.

In another embodiment, the help request received by the processor to trigger help is a single help-link that includes the identification of the repository, the application system, a task for which help is requested in the application system, and a user of the task that generated the help request.

Still another embodiment will create the help request, by the processor, responsive to a help-request from the task in the application system executing on the processor.

In another embodiment, when the relations of the application system indicate plural process models and plural objects, the processor receives the plural process models and the plural objects for the plural process models; then filters the plural process models and the plural objects by predetermined type; and the processor provides, as the response to the help request, the relations, and the plural process models and the plural objects as filtered by the predetermined type.

Still another embodiment provides a system, method and/or non-transitory computer readable medium for generating help for a process which is defined by a process model definition stored in a repository, the repository is accessed through an application programming interface (API). The processor transmits a help request to trigger help, wherein the help request identifies an application system for which help is requested, wherein the application system is in a repository which provides an application programming interface (API) that navigates and accesses contained objects in the repository and process model definitions in the repository. The help request to trigger help is a single help-link that includes the identification of the repository, the application system, a task for which help is requested in the application system, and a user of the task that generated the help request.

In still another embodiment, the processor provides a response to the help request, wherein the response to the help request includes a visualization of relations, process models and objects contained in the repository which are relevant to a combination of the application system, the task, and the user.

A further embodiment is a non-transitory computer readable medium comprising executable instructions for performing a method according to one or more, or a combination, of the foregoing embodiments.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 8 is code for an example DPHG configuration, part 1;

FIG. 9 is example code for DPHG configuration, part 2;

FIG. 20 is an illustration of a link.

DETAILED DESCRIPTION

Figure 1:
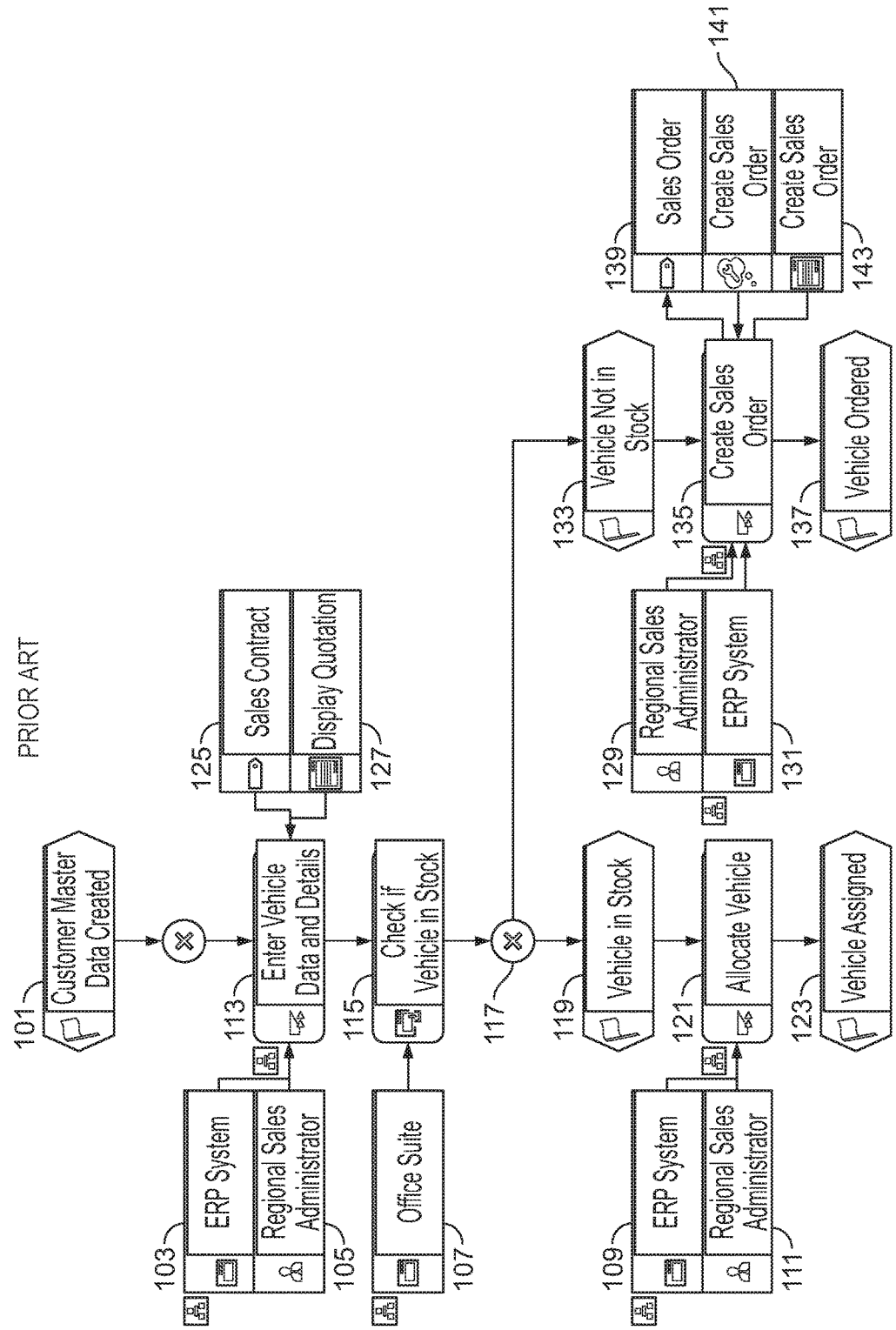
FIG. 1 is a schematic diagram illustrating an example of an ARIS business model.

In overview, the present disclosure concerns a help system, such as may be provided online, such as for example with regard to an application, for example a business process; and which involves tying together a process definition of one or more applications including the application for which help is requested, for example a business process definition of one or more business applications, via a repository (such as a business process repository) which stores information regarding the applications' processes, and the application itself, so that a help can be provided (for example, in response to a help request), in which a user can see which part of the application (e.g., which part of a business process) is being currently executed and what the current activities' parameters, descriptions, and/or restrictions are, so as to provide help information based on the repository itself via the repository's application programming interface (API). A link, which identifies the repository, the user's task for which help is requested, the user's system, and the user, can be utilized as the help request which triggers the help system; rendering software can provide a visualization of the response to the help request rendered from the current repository information. Consequently, a help system and/or method can be provided which is process oriented, is usable independent of the application system, is specific to the user's situation when help is requested, and is up-to-date based on the repository itself each time help is requested without requiring a separate update of the help system.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

Definitions

The claims may use the following terms, which are defined to have the following meanings for the purpose of the claims herein. Other definitions may be specified in this document.

The term "application programming interface" or API as used herein and in the claims is defined as a set of data structures, protocols, routines and tools for accessing a software application, as the term is ordinarily used by those of skill in the art.

The term "process model" as used in the claims is defined as the process model which includes definitions that are provide to implement an application system, and are not intended as part of a help system; a process model may be a "business process model." An example of a business process model is well understood to those of skill in the art of SAP, and to those skilled in use of the ARIS program available from Software AG.

An example "business process repository" or "BPR" is the SAP Solution Manager which provides content of the offered SAP solutions in form of realized business scenarios, business processes and process steps. Instead of building up the business blueprint always from scratch the available Reference Content from SAP Solution Manager can be reused to provide a business blueprint which is synchronous with the used SAP solutions in the project. In the example a business process with all its process steps is downloaded from BPR into the business blueprint. It is possible to adjust the business blueprint afterwards according to the business needs. New business scenarios and business processes can be added manually into the business blueprint or the downloaded business processes from BPR can be adjusted by deleting or adding some process steps. The synchronization with the ARIS product works as described in the section Synchronization with the Solution Manager. The idea to build industry specific content for reuse purposes is not limited to SAP solutions. Other reference content can be found for example on the homepage of the American Productivity and Quality Center APQC. The present specification is discussed several times in connection with a BPR, however, it should be noted that the BPR and repository can be used with processes that may not be strictly considered a "business" process but are still follow the principals of the BPR.

The term "computer system" or "computer" used herein denotes a device sometimes referred to as a computer, laptop, personal computer, personal digital assistant, notebook computer, personal assignment pad, server, client, mainframe computer, or evolutions and equivalents thereof.

The designation "enterprise resource planning" or "ERP" is intended to indicate business management software as is known to one of skill in the art, typically a suite of integrated applications, that a company can use to store and manage data, including product planning, costs and development; manufacturing; marketing and sales; inventory management; and shipping and payment; and which provides a real-time view of business processes using common databases maintained by a database management system.

A "transaction code", sometimes referred to as a "t-code," consists of letters, numbers, or both, and is entered into the command field in accordance with known techniques to access functions in a SAP application more rapidly; each function in a SAP ERP has a SAP transaction code associated with it.

The designation "XML" or "Extensible Markup Language" refers to mark-up languages which are consistent with the W3C Extensible Markup Language (XML) 1.0 (Fifth Edition), variations and extensions thereof.

End of Definitions

As further discussed herein below, various inventive principles and combinations thereof are employed to provide a system and/or method for handling help processing. Whereas normally business process models and definitions are mainly used in accordance with known techniques for implementation and documentation, herein business models/ definitions are disclosed to be extended to help processing that was never before possible.

1. Business Models/Business Process Management Tools

The ARIS product suite, available from the company SOFTWARE AG, is one of the market leading business process management tools. Customers use ARIS product to document and analyze their internal processes and organization. The business models created with ARIS (a JAVA programming language based tool) will be later published into the organization's internal website so that the created models are available to all employees. FIG. 1 shows an example how a model created with the ARIS product could look. The ARIS product provides a convenient example of a business process model system; other business process modeling tools and methodologies are known and can be used in connection with the system/method discussed herein.

Referring now to FIG. 1 is a schematic diagram illustrating an example of an ARIS business model will be discussed and described. The ARIS model includes an indication of application systems, here represented by ERP system 103, 109, 131 and Office Suite 107; and functions, here represented by "Enter Vehicle Data and Details" 113, "Check if Vehicle in Stock" 115, "Allocate Vehicle" 121, "Display Quotation" 127, and "Create Sales Order" 135, 141, 143. User roles are indicated, here represented by "Regional sales administrator" 105, 111, 129. Also indicated is data, here represented by "Customer Master Data Created" 101, "Vehicle in Stock" 119, "Vehicle Assigned" 123, "Sales Contract" 125, "Vehicle Not In Stock" 133, "Vehicle Ordered" 137, and "Sales Order" 139". As can be observed from the business model, the data flows from the Customer Master Data created 101, to the task of entering the vehicle data and details 113 (performed by the regional sales administrator 105 on the ERP system 103), resulting in a display quotation 127 and a sales contrast 125. The application system Office Suite 107 then performs the task to check if vehicle in stock 115. If the information indicates that the vehicle is in stock 119, then the ERP system 109 is used by the regional sales administrator 111 to allocate the vehicle 121, resulting in an indication of the vehicle assigned 123. If the information indicates that the vehicle is not in stock 133, then the ERP system 131 will created the sales order 135, resulting in an indication that the vehicle is ordered 137. Also represented herein is that the task to create sales order 135 is further expanded into a sales order information 139 which is input to a task of create sales order 141, which results in the indication that the sales order is created 143.

Business models, such as those created with ARIS and/or other business process model systems, contain much helpful information which describes and documents the processes, but which nevertheless is conventionally not leveraged to provide help information. First, a model typically contains the process information itself, such as which event is triggering which function, which rules exists in the process flow, and so on, as is known in the art. Second, a model typically has detailed descriptions maintained in their attributes. Finally, the model typically has typed relations to other typed objects like one or more application systems executing the functions, to roles responsible for them, to information carriers related to any kind of documentation for them, and many, many more.

One or more business models prepared as discussed above, for example, can be collected together into a repository. The set of models, objects and relations in the following discussion is referred to as a business process repository (BPR). A concept of a BPR is outlined in the UML class diagram of FIG. 2, which is a rough example.

Inside the BPR a user can navigate from one BPR item to the other via the relations of the BPR. To navigate through the BPR we define different kinds of steps. A user can navigate via a connection relation from an object to another object (e.g. a function is executed by a role; there is a connection of type 'is executed by' between function and role). A user can navigate via a link relation from an Object to a model which describes the object in more detail. Via the same relation a user can also navigate from the model to the object it is detailing. Finally a user can navigate from an object to all models which contain the object and again vice versa from a model to all objects it contains. So a user can go step by step through the BPR from an arbitrary item to the other.

Figure 2:
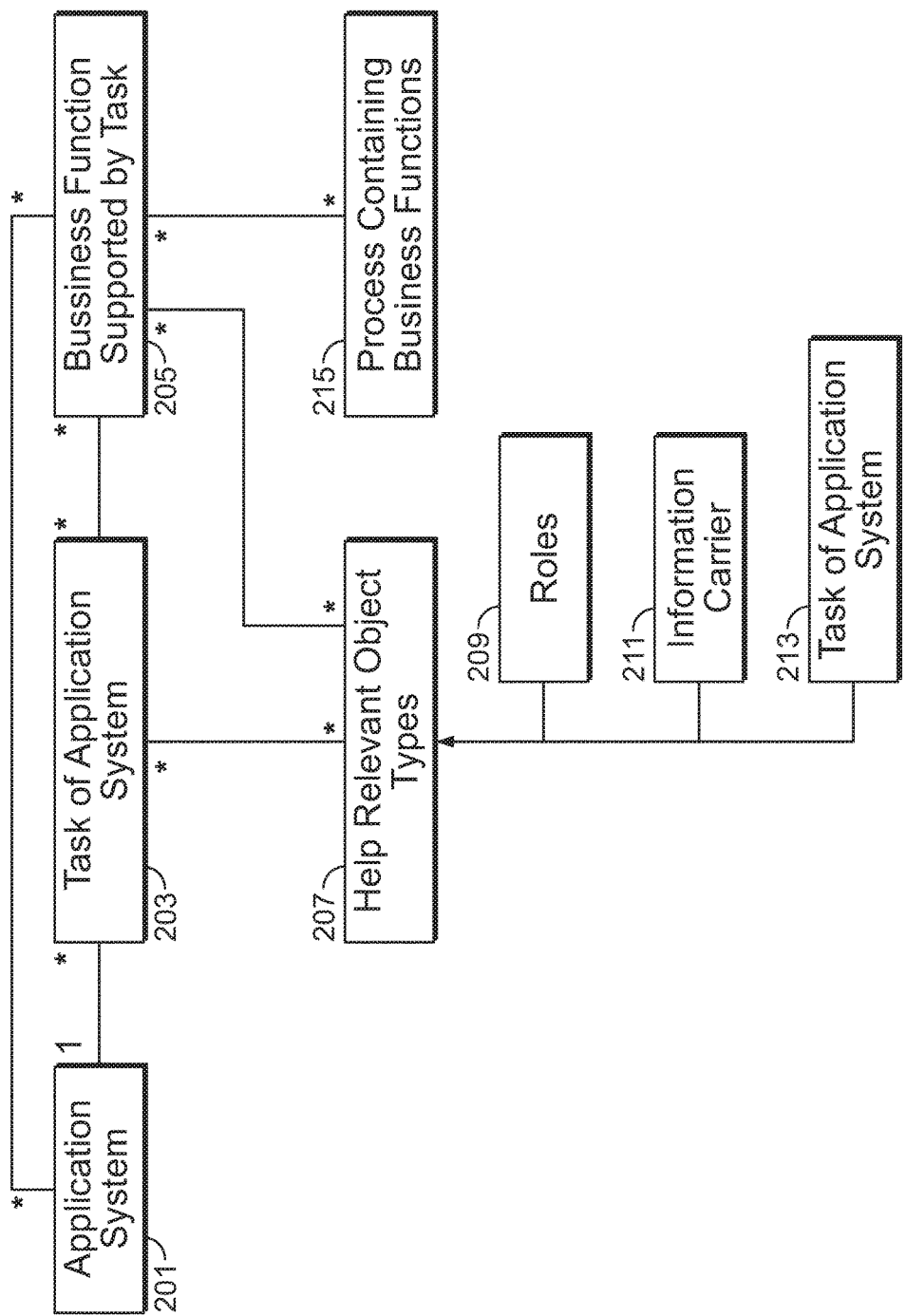
FIG. 2 is a unified modeling language (UML) class diagram illustrating relations inside a business process repository (BPR)

Referring now to FIG. 2, a unified modeling language (UML) class diagram illustrating relations inside a business process repository (BPR) will be discussed and described. In FIG. 2, there is an application system 201, a task of the application system 203, a business function supported by the task 205, help relevant object types 207, roles 209, information carrier 211, task of application system 213, and a process containing business functions 215. In this regard, it should be noted that standards are known for UML class diagrams.

There can be relations (e.g. a many-to-many (*:*) association between "Task of Application System" 203 and "Process containing Business Functions" 205) and more indirections (e.g. the "Business Function supported by Task" 205 can have associations to subtasks ("Help Relevant Object Types" 207 and "Process Containing Business Functions" 215) which again can have arbitrary associations to other objects (Roles 209, Information Carrier 211, and Task of Application System 213)). The relations can be given by direct connections (e.g. a connection of type 'executes') between objects, and/or by relations between objects and models. Relations cane be one-to-one, one-to-many, many-to-many, etc. as is known in the art. Consequently, the BPR can become very complex depending on how the process(es) are modeled.

The challenge is to bring all that information already provided and possibly contained in the BPR to end users in a useful and accessible way to assist them in their daily work.

Figure 3:
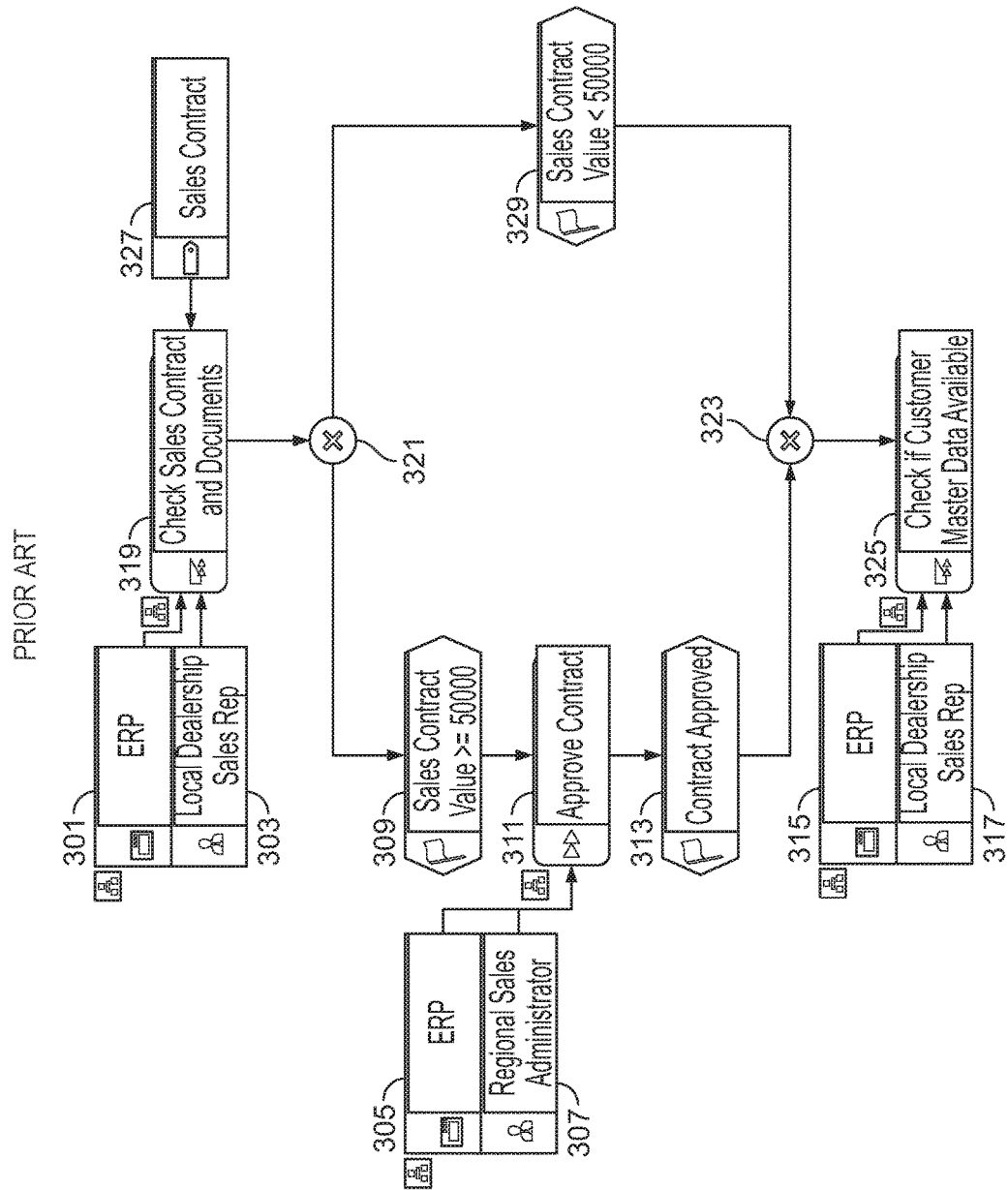
FIG. 3 is a schematic diagram illustrating help in a form of process information.

For example, consider a situation in which a person in charge has to do a task in an application system and is unsure about how to proceed. The traditional help provided by the application system itself does not answer questions such as, what is the maximum value I can enter in a field of my application before I need approval. This kind of information may be indicated in the BPR which, for this example, defines that the system will trigger the approval process, when the value exceeds a predetermined distinct amount. FIG. 3 is a business process model, here an ARIS business model, which illustrates an example showing the necessary approval flow for a pre-determined distinct amount.

Referring now to FIG. 3, a schematic diagram illustrating help in a form of process information will be discussed and described. FIG. 3 illustrates the application system ERP 301 executed by the local dealership sales rep 303, to perform a function to check sales contract and documents 319; the sales contract 327 is provided to the function 319. The model indicates a decision 321 to determine whether the sales contract value is <50000 or sales contract value is >=50000. If the sales contract value is >=50000 309, then the function to approve the contract 311 is approved, which as illustrated requires the regional sales administrator 307 running the application ERP 305 to provide input, so that the contract is approved 313. If the sales contract value is <50000 329, it can be seen that approval is not needed. Then, the business process flows merge 323, the application system will perform the function to check if the customer master data is available 325, which requires input from the local dealership sales rep 317 executing the ERP 315 application. From the simple business model of FIG. 3, it can be readily grasped that the sales contract value of 50000 results in a different flow which requires approval by a different user. However, a traditional help system does not conveniently provide the relevant information to a user, e.g., the local dealership sales rep or to the regional sales administrator. Furthermore, it will be appreciated that a design change cannot be promptly indicated to the user by a classic static help set which will have to be updated. In any event, business models are rarely so simple and it can be difficult to find the desired information from a display of the business model.

From FIG. 3 and the related discussion, it will be appreciated that it is desirable for an end user to have access to help beyond the classic help set of the application system that is being used and the related process information. Furthermore, it would be desirable for the end user to have a dynamic view of the help, which means two things. First he should have a look at the processes and how they are defined currently in the BPR. That is, it is not as helpful to generate a static help set, provide and distribute it, while in the meantime another process has changed. Second he should only have access to the processes which are relevant for him and, of course, which he is allowed to see.

2. Observations about Help Systems

Representative state-of-the-art solutions which are currently available and the inventor's observations about some of their drawbacks in comparison to the new system and method disclosed herein are discussed in the following sections (A) to (E):

(A) The Classic Help

The classic help, sometimes referred as F1-help, of the application system provides only information about functionalities of the application system itself. Information about processes which are supported by this application is not considered.

The classic help has no process-specific information at all. In case of an office suite application, classic help explains for example how to create a document template but not which template to use in specific use cases. Unfortunately, that may be exactly the help needed.

(B) Access to the BPR Via the Process Modeling Application

Since a user is interested in processes, a user can look up the information by using the process modeling application (API) itself, which comes along with the BPR. The user can browse through the complete repository and use the features of the process modeling application to find the wanted information.

If users are granted access to browse the BPR through the process modeling application (PMA) itself (also referred to as the BPMA), the dynamic aspect is fully covered. That is, the information about the processes is always up to date, and it can only be accessed if rights are granted.

Figure 13:
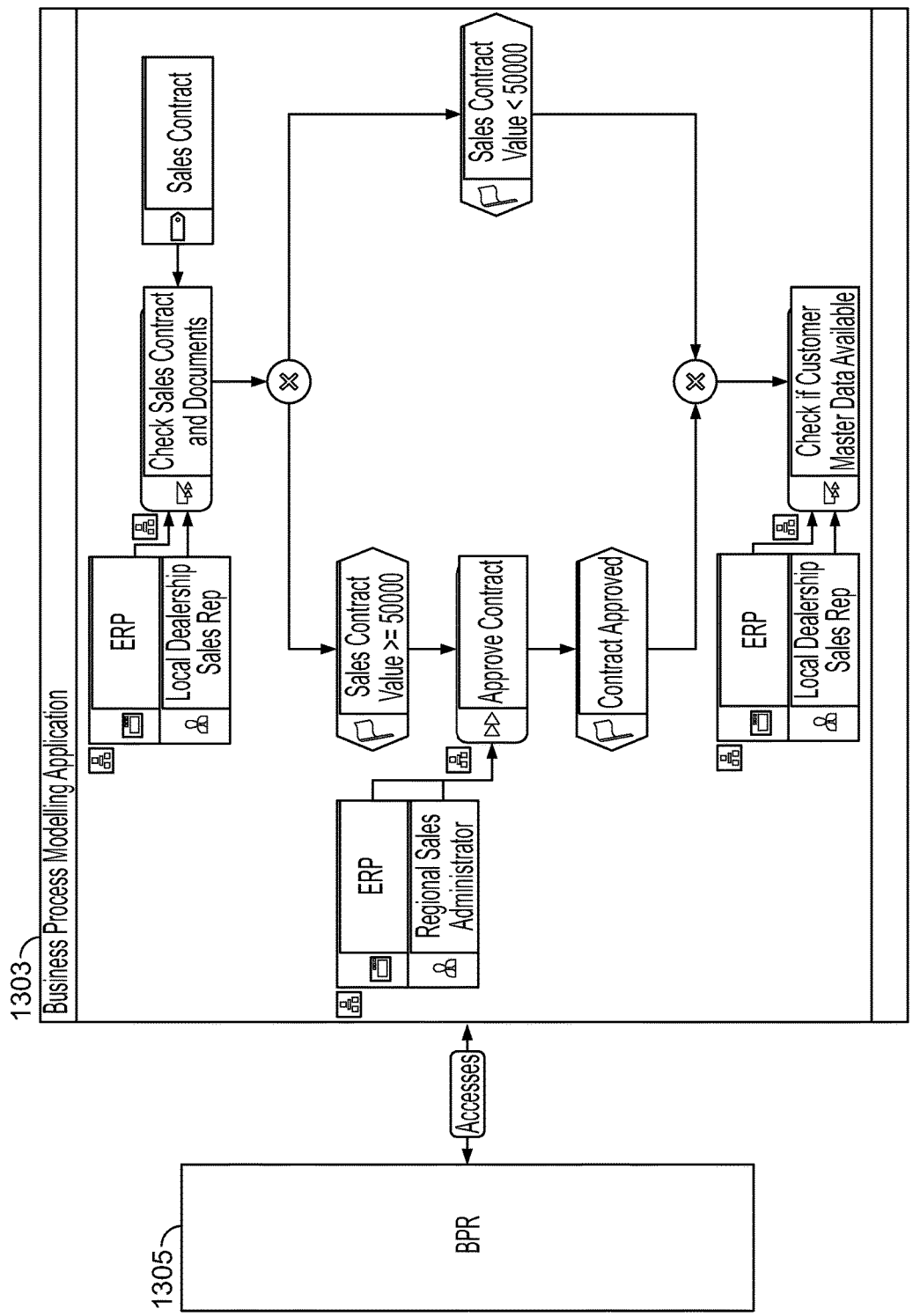
FIG. 13 is an illustration of a relationship between a task change order in an enterprise resource planning (ERP) system (SAP) and a BPMA.
Figure 13:
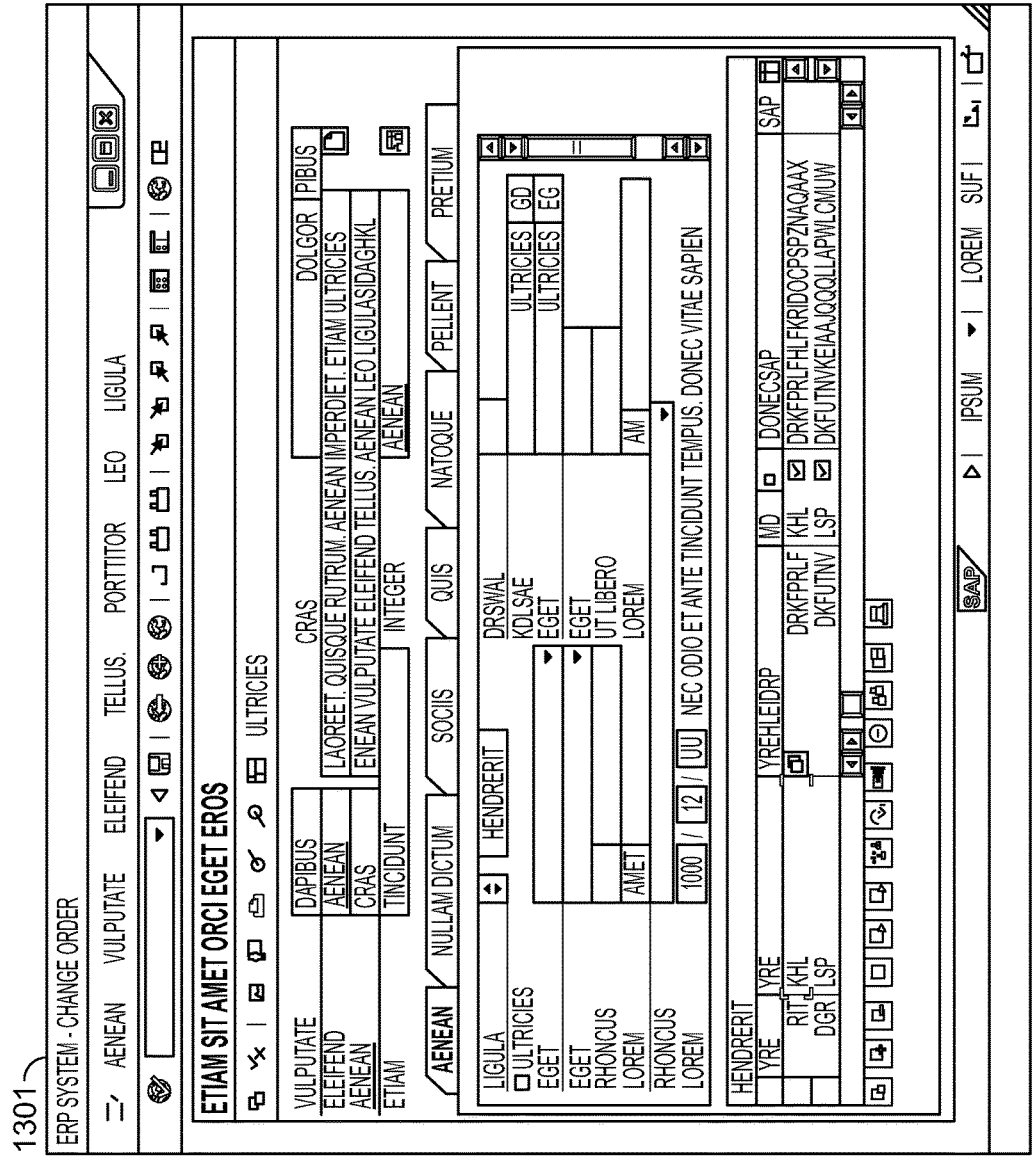

Referring now to FIG. 13, an illustration of a relationship between a task change order in an enterprise resource planning (ERP) system (SAP) and a BPMA will be discussed and described. Here is illustrated a user interface 1301 of an ERP system, for example, SAP; a BPR 1305, and a BPMA 1303. The task in the ERP system, represented by a task "change order" is displayed on the user interface 1301. The task inside a change order process, including additional information such as organizational unit, contact persons, and the like, can be visualized by the BPMA 1303 which accesses the BPR 1305. In this illustration, the BPMA 1303 corresponds to the business process model of FIG. 3.

Figure 4:
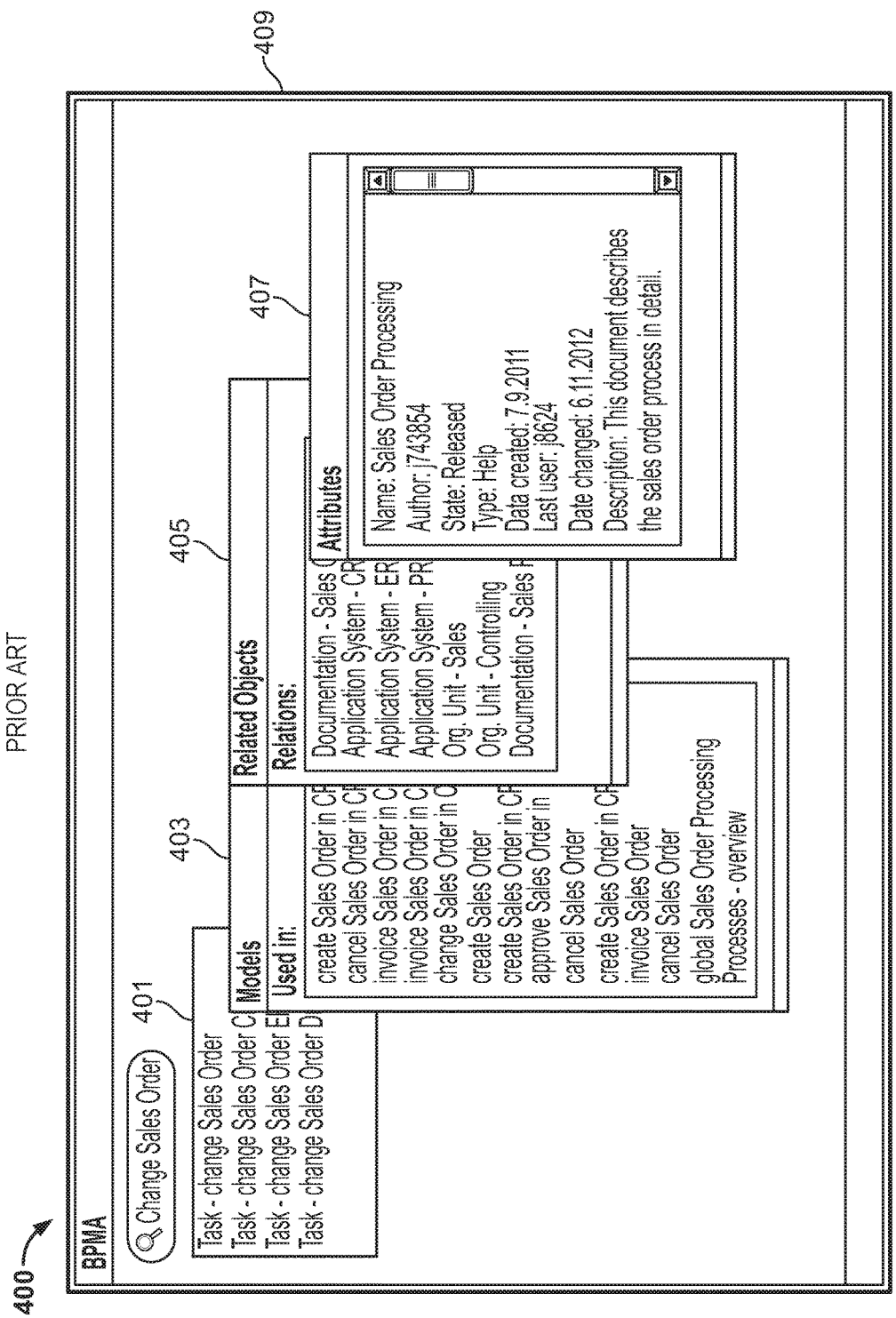
FIG. 4 is a screenshot illustrating trying to find information in a business process management application (BPMA)

One problem is the convenient accessibility of the information. Even if the information is there, it would take a user far too much time to find exactly what is needed, as illustrated in FIG. 4. Imagine that you need help for changing a customer order in an ERP system. This is very common task and when you search for it you find reference to a "change order" in many processes (order is new, order is already processed, order is about service request, order is about production, order is or is not allowed to be canceled, it's an order of a max attention customer, and so on, and so on . . . ) Since it is a common task, it might be that some of the processes also do not belong to the ERP system which you are looking in. So you have to examine very carefully each of the processes to check if it is the one you want by manually examining attributes and relations. Of course, this is something a user does not want to do when he just wants some quick help for his task.

Referring now to FIG. 4, a screenshot illustrating trying to find information in a BPMA will be discussed and described. Here, the user who has access to the BPMA user interface 400 has pulled up a window 401 which includes tasks for "change sales order", a window 403 which lists models which use the terms "change sales order," a window 405 which lists related objects which refer to the terms "change sales order," and a window 407 which lists documents having "attributes" which refer to the terms "change sales order." Each of these might have to be examined until the user determines whether the information is relevant. Much of the information provided is not relevant to a current process being executed by the user.

Besides this, consider that a process modeling application is quite a complex tool. To enable the user for the search process above, he also might need a really good help just to create an appropriate search.

(C) Published BPR

After a BPR is published into the organization's intranet, all employees can access the published processes via a simple web interface. The user can browse through the published repository and use the features of the web interface to find the desired information.

Publishing the BPR does mean that you have exported the content of your BPR to your company's intranet. After that, each employee can directly access the content of the BPR through a simple web interface.

With this approach there are still the same problems in finding the necessary information as with the PMA. It is still not possible to find, in an acceptable way, the help which is needed. The ease of use may be increased since it is simple web interface, but at the cost of functionality which makes it even more difficult to find the desired help.

The dynamic aspect is also limited by the fact that a user does not directly access the BPR but only the content at the time the export was created.

(D) ARIS for SAP—Online Guide

The ARIS Online Guide is an add-on to ARIS Business Publisher. It can provide a SAP specific solution that shows all information, processes and related objects based on a static publishing for a given SAP transaction code.

Figure 5:
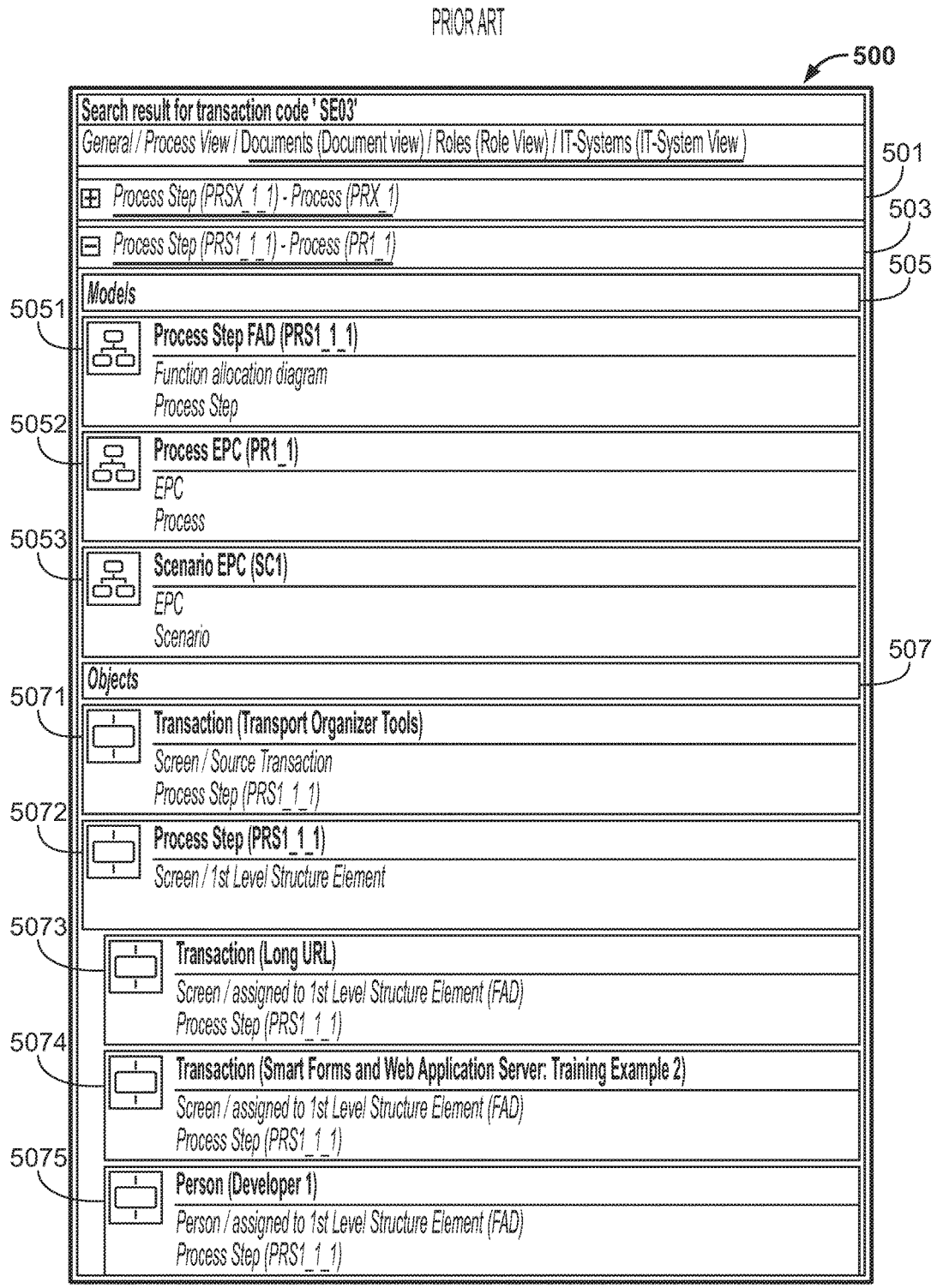
FIG. 5 is a screenshot illustrating an ARIS online guide.

The ARIS Online Guide, an example screenshot of which is illustrated in FIG. 5, provides SAP specific information of processes for SAP transactions in exactly the way the user wanted it and is based on a publisher export. A user is provided a list of functions 501, 503 belonging to the respective transaction code for which the user requested the help. This includes the name of the process containing the function. By expanding 505, 507 a node of the list, such as node 503, the user can see all related information to that node at a glance. This includes the context of the process given by its superior processes 5051, 5052, 5053 as well as all related objects 5071, 5072, 5073, 5074, 5075 like information carrier, organizational stuff and other SAP transactions to that node.

The user can also define some object types, which are evaluated just by their relation to the business function. These are shown separately from the process view.

The problem with this solution is, that it is not application system independent but totally SAP specific. Only processes which are managed by SAP Solution Manager and which are synchronized with ARIS are supported and only objects of type screen can be used. (Screen is the object type, which represent in the ARIS BPR SAP transactions.)

Although this is a process oriented help, it is not application system independent and since it is based on a BPR export it is also not dynamic regarding the up-to-date aspect while the role aspect is covered by the ARIS Publisher which embeds the ARIS Online Guide.

(E) Wiki

Another approach which is quite often used in companies are wikis. A wiki is a known open, generic web interface where users can add any kind of information. A typical wiki product is, e.g., the CONFLUENCE wiki software from the company ATLASSIAN. A wiki can, of course, also include process related information. In a wiki one could provide for each task a page providing information about that task. That can also include process information which is given by links to a published BPR export. A user can then try to use the search functionalities of the wiki to find the desired information.

While it first looks nice to have such a system, which can be completely designed in a way as desired, the problem with a wiki is the effort that must be invested in creating the wiki pages, and, of course, in maintaining them because each time the BPR changes the wiki pages must be updated. Consequently the dynamic aspect is completely missing, and the wiki is not up-to-date with the BPR.

3. Concepts

It will be appreciated from the above discussion in Section 2, parts (A) to (E) that all known types of help have a significant disadvantage and none of them fulfills all of the stated goals. All of today's existing solutions do not provide the desired solutions as discussed above, and furthermore they have some big restrictions regarding one or more of actuality, accessibility, dynamic aspects (up-to-date BPR access and user based) and/or supported application systems.

A new solution is needed: a dynamic process help generator (sometimes referred to herein as DPHG).

Further in accordance with exemplary embodiments, there is provided an innovative technique for creating a help independent from any application system and fully applying to the dynamic aspect. The technique described will not only apply to one particular application system (like ERP, Office Suite, etc.) but can be applied to applications systems in general.

The help includes the process model which describes the task of the end user in detail and the information to related objects which are accessible through that process model. (e.g. a contact person that has a 'supports' connection to a business function in the process model). It is not our goal to provide a help composed of text modules, images and similar, but to collect in a smart way the process models and related information to that process model all through the BPR.

Herein is introduced a help generating component that is able to identify the belonging process model and BPR information to a given task from any application system. Herein is described a mechanism that allows, in a very easy way, to navigate through the BPR by defining step by step how to go from the task in the BPR to the belonging process models and the related information.

Core ideas include a combination of one or more of the following:

- For each task T executed by any arbitrary system S we create a link $L_{ST}$ to a given BPR. The link contains all information needed to identify the current tasks that are about to be processed in S. Conventional techniques can be used to obtain that information; the information is used as an entry point.
- A configuration C is defined which describes how to identify the task T in the BPR and how to navigate from that task to any process model relevant for that task. C contains for each S a configuration $C_S$. Since this configuration is completely BPR specific, there is no parallel to other XMLs used in previous patents.
- The navigation is realized by defining steps. A step describes a navigation via a BPR relation. That is a connection from one typed object to another, from one typed object to the typed model which contains the object, from one typed model to the object it is detailing or describing.
- A filter can be added to the configuration that allows considering only typed objects or typed models of a distinct type. This can give the user only the information relevant for him. For example, for an ERP system, if we go a step from an object to the models containing the object, we do not want all models but only models which are of type business process model. If we come from a more technical application system like, for example, a workflow engine, we can just change the type to BPMN or UML types and instead of having business information we can provide technical information through the models.
- We assume that the BPR conventionally provides an API which supports navigating the BPR by the user and allows/restricts access based upon the user to the contained objects of the BPR. This ensures the dynamic aspect of the solution.
- Herein is also introduced a dynamic process help generator (DPHG). Based on the information passed in the link $L_{ST}$ to the dynamic process help generator (DPHG), the DPHG evaluates the configuration $C_S$, accesses the business processes and objects through the BPR API by allowing the defined steps and/or filters, and delivers them to a renderer, which formats them and is responsible for the visualization aspect.

This technique can work with any BPR and any application system, no matter in which form the relations are stored in the BPR. For example, this technique can work, e.g., with ERP systems like SAP as well as with application systems like an office suite and/or others.

Figure 6:
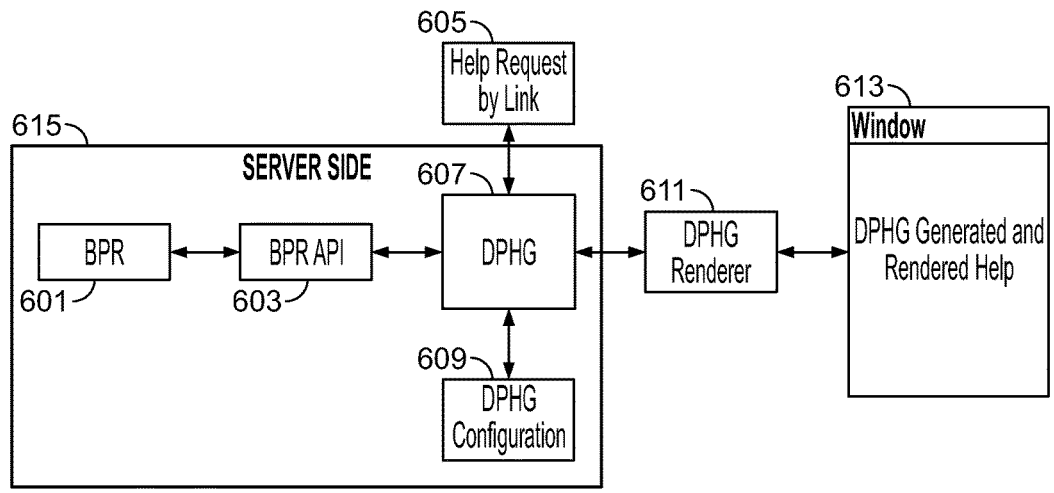
FIG. 6 is a block diagram illustrating dynamic process help generator (DPHG) components and their environment.

Referring now to FIG. 6, a block diagram illustrating dynamic process help generator (DPHG) components and their environment will be discussed and described. One or more BPRs are represented by a BPR 601 which is associated with its API 603, a DPHG 607, a help request by link 605 passed to the DPHG 607, a memory storing the DPHC configuration 609, a DPHG renderer 611, and a window 613 which displays the DPHG generated and rendered help. The BPR 601, BPR API 603, DPHG 607 and DPHG configuration 609 can be provided on a server side 615, for example in a client-server configuration. Based on the information passed in the help request by link 605 to the DPHG 607, the DPHG 607 determines which of the configurations previously stored in the DPHG configuration 609 are relevant to the link, access the business processes in the BPR 601 through the standard BPR API 603, delivers information about the business process and objects to the DPHG renderer 611, which formats the information as the DPHG generated and rendered help which can then be visualized, for example displayed on the window 613.

In this illustration, the DPHG 607 resides on the server side 615 as a server component; however, in other embodiments it might not be part of the BPR server. Note also the renderer 611 might be usually part of the client, but in other embodiments, for example, a pure web environment the rendering might also be done on server side, generating HTML content that is then passed to a browser component visualizing the HTML.

Example BPRs 601 and its API 603 have been discussed above.

Each of the other components of FIG. 6 is discussed in more detail below. The help request by link 605 which passed to the DPHG 607 is discussed in more detail in Section 4, part (A), "Requesting the Help." The DPHC configuration 609 is further discussed in Section 4, part (B), "DPHG Configuration." The DPHG 607 is discussed in more detail in Section 4, part (C), "DPHG Configuration." The DPHG renderer 611, which provides the help for visualizing on the window 613, is further discussed in Section 4, part (D), "Visualizing the Help."

Figure 7:
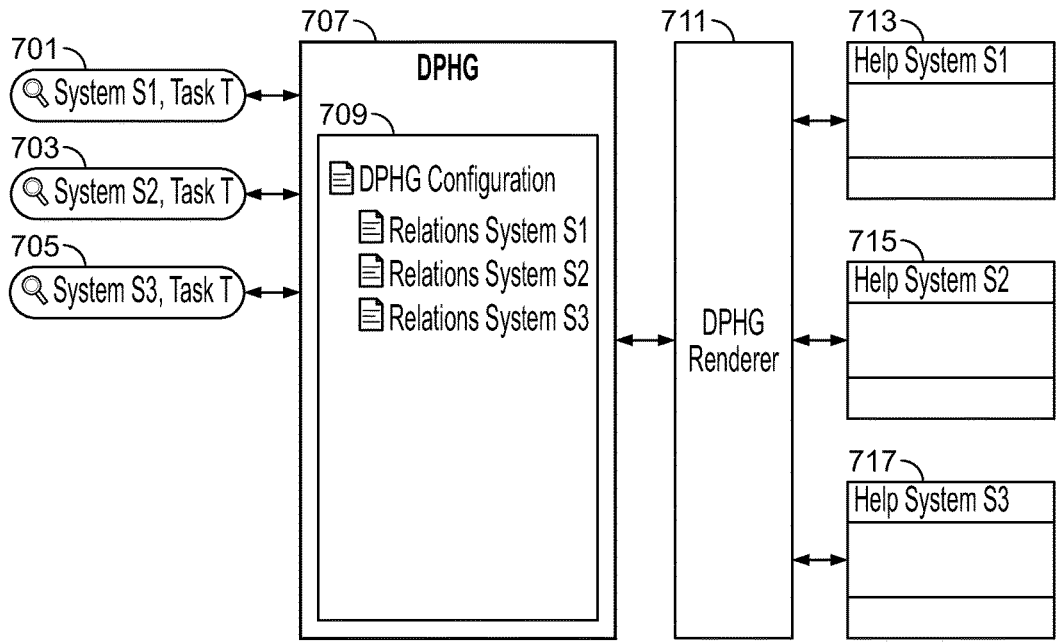
FIG. 7 is a block diagram illustrating process help generation based on configurations.

Using this approach has several advantages over the convention help systems:

- The help can be up to date because it is generated directly from the BPR at the moment help is requested.
- The help can be personalized in a way that only help content allowed to the end user is shown to him. This can be realized through the BPR API that the DPHG uses internally, without providing additional access controls in the help system itself
- The process oriented help can be provided for each used application system in a company just by defining relations for different application systems first in the BPR and then in the DPHG configuration, as illustrated in FIG. 7. As an example consider the case that you have two application systems. One is a business related ERP system where your person responsible has to change an order. The other is a technical application system in which your development department provides services for the order management process. The business function 'change order' in the BPR is related to a task 'change order with ERP' in the BPR representing the same task in the ERP system through a 'is represented by' connection. The same business function has also a relation 'is implemented by' to the service in the BPR representing the service in the technical application system. The business function is also detailed in process models regarding the business process (like event process chain diagrams) and in models regarding the technical information (like UML and BPMN diagrams). And while the office person is of course only interested in business relevant information stored in business process models, the developer wants to see only the BPMN and UML models. So you define two sections in your configuration, one for the ERP system, with the task as entry point, defining steps and filter leading from the task to the business model and another section for the technical application system with the service id as entry point, defining different steps and filters leading to BPMN and UML models.

Referring now to FIG. 7, a block diagram illustrating process help generation based on configurations will be discussed and described. FIG. 7 assumes that there are one or more application systems, here System S1, System S2, System S3; tasks, Task T, are executing on the application system(s). The tasks may be the same or different. One or more of the system/task combinations (represented here by System S1, Task T 701; System S2, Task T 703; and System S3, Task T 705) might request help from a DPHG 707. The DPHG 707 can access a DHPG Configuration 709, which stores a configuration of relations per system, e.g., Relations System S1, Relations System S2, Relations System S3; the configuration of relations per system indicates which of the relations of the BPR are evaluated for that system. The DPHG 707 evaluates the one of the configurations in the DPHG configuration 709 which relates to the system making the help request, accesses the business processes and objects indicated by the one of the configurations (through the BPR as discussed elsewhere herein), and delivers the information regarding the business processes and objects to the DPHG renderer 711. It will be appreciated that the BPR is accessed on behalf of the requesting System/Task, and only with respect to the relations which are relevant to the requesting system (which are listed in the DPHG Configuration for the system); consequently the information returned to the DPHG 707 is only that which will be used by the requesting system and to which the BPR permits access by the requesting System/Task. The DPHG renderer 711 formats the information as discussed elsewhere herein, and provides the help for visualization. This results ultimately in providing a help system specific to the one of the systems that requested help, represented by Help System S1 713, Help System S2 715, and Help System S3 717. The help system then can be accessed by the task which requested the help, e.g., Help System S1 713 is accessed by System S1, Task T 701; Help System S2 715 is accessed by System S2, Task T 703; and/or Help System S3 717 is accessed by system S3, Task T 705.

As shown in the example of FIG. 7, even if the same task is executing in different application systems, there are three different process helps, each of which depends on the configuration of the system on which the task is executing.

4. Implementation

As mentioned above, here is informally introduced a new kind of functionality, referred to as DPHG (=Dynamic Process Help Generator). This functionality is independent from the concrete used BPR and the system applications for which DPHG is used to provide help.

(A) Requesting The Help

In this system, the BPR is intended to deliver information for help about a task in an application system. For accessing the BPR and for the dynamic aspect it may also be necessary to identify the user. Thus, the link (which can be used to deliver the help request and/or to initiate the help system, referred to sometimes herein as a "help-link") can specify the BPR, the user, the application system, and the identification of the task. For example, the link can take the following format (in any order):

BPR+Userinformation+ApplicationSystemInformation+TaskInformation

For a BPR created with the ARIS product, the link may look like the link illustrated in FIG. 20.

The application system information id can be used by the DPHG to identify the set of relations stored in the configuration, and the task-id can be used to identify the instance of the task in the BPR.

(B) DPHG Configuration

As explained above, the relations in the BPR might differ depending on what kind of application system you have or just in the way you like to build your relations. If the user reconsiders the above example with their development department, the user could alternatively have, not the services related directly to the business function, but have defined for the services some operations and have them related to the business functions. So a user would change the configuration by replacing the one step "service to business function" by two steps "service to operation" and "operation to business function." Instead of changing the configuration, a user can also add the second case to the configuration to have both use cases supported.

It might also be that the user has no relation to a business function at all but has detailed the service directly with a UML diagram, or that the id used as the entry point is not the service id but the operation id, or similar.

So we have to provide a structure that tells the DPHG how to get the information needed for a distinct application system from the BPR.

In the configuration file, the following can be defined:

1. The application that is requesting the process help. The application is identified by an id that comes along with the link passed to DPHG.

2. The BPR object that represents the application's help item for which the help request is send, which we call task. This is usually a typed object (screen, service, operation . . . ) of the BPR having the id of the help request id maintained in an attribute. This is the entry point into the BPR and the help request id is also part of the link. The help request id maps the task or help relevant object of the application system to the specific BPR object representing that task or help relevant object of the application system.

3. Next we have to find the related business functions to the task. For that we define a sequence of steps that we have to go to navigate from the task to the business function we are interested in. The first step starts always from the task. By executing one step after the other we can navigate through the complete BPR and reach finally the business function. For the steps we define three types A. Connection—navigate to a typed object by a connection from the result of the previous step.

B. Occurrence—navigate to a typed model that contains the object that was the result from the previous step or navigate to the typed objects that are contained in the model that was the result of a previous step.

C. Link—navigate to the typed model that is linked to the object that was the result of a previous step or navigate to the typed object that has linked the model that was result from the previous step.

4. Each step can also be filtered by distinct types for connections, objects and models. Typed object and typed model means that the objects of different types represent different things and models of different types are used to represent different circumstances. So for the ERP use case we have objects of type 'screen' and 'function' related to objects of type 'organizational unit'. 'information carrier', etc. and models of type 'event process chain', 'function allocation diagram'. For the technical use case we have object types like 'service', operation and model types like 'UML' or 'BPMN'.

5. Next we want to collect related help relevant objects to the business function and the task. Again we use the steps, of course different ones, to reach them with the same mechanism as in the previous point.

6. Finally we add the help relevant process models we are interested in starting again from the task and the business function using the step mechanism.

7. If you have different ways how to reach something via the step mechanism, you just have to add an additional entry for that in the configuration.

Note that the terms task for the entry point and business functions for the result of the last step in the xml configuration are just placeholders for any typed object.

For the DPHG configuration, we introduce the following structure, which conveniently can be implemented as an xml-based configuration:
dphg—Contains applicationsystems
applicationsystems—Contains aplicationsystem
aplicationsystem—has id to identify the aplicationsystem, same value as given in the link. Contains relations.
Relations—groups task_types, task2businessfunctions, helprelevantobjects, helprelevantmodels
task_types—contains task_type. Each task type can be considered as a start object for searching help content.
task_type—has 'type' which identifies the object type in the BPR representing a task in the application system. Contains 'attributes'.
attributes—contains 'attribute'.
attribute—specifies the attribute that contains the value for the taskid given in the link.
task2businessfunctions—contains task2businessfunction. Describes how the business function are related to the task.
task2businessfunction—contains steps for navigating from the task to the business functions.
Step—has 'to', the BPR item which follows the current BPR item. That can be an object type or a model. Has 'connectionkind', the kind of relation to evaluate. That can be one of 'CONNECTION,' 'OCCURRENCE' or 'LINK'. Contains 'types' and 'connection types.' A step can follow a previous step. The output of the previous step can be input for the following one. The first step has depending on its parent the task or the business function as input.
types—contains 'type'
type—lets the models be filtered from a step. An id depending on the used BPR representing the model type that has to be used during a 'step'.
connectiontypes—contains 'connectiontype'.
connectiontype—lets the 'connectionkind' be filtered from a step. An id depending on the used BPR representing the connection type for kind 'CONNECTION' or a symbol type for kind 'OCCURRENCE' that has to be used during a 'step'.
Helprelevantobjects—contains 'businessfunctions2help' and 'tasks2help'. Groups how the objects that are relevant for the help can be reached using steps.
businessfunctions2help—contains businessfunction2help. Groups how objects that are relevant for the help can be reached by businessfunctions using steps.
businessfunction2help—contains 'step'. See previous entry.
tasks2help—contains task2help. Groups how objects that are relevant for the help can be reached by tasks using steps.
task2help—contains 'step'. See previous entry.
Helprelevantmodels—contains 'businessfunction2process' and 'task2process'. Groups the models containing the process relevant information of the help.
businessfunction2process—contains steps defining how to reach the model from the business function.
task2process—contains steps defining how to reach the model from the task.

To further clarify the above xml-based configuration structure, an example is illustrated in FIG. 8, code 801 for an example DPHG configuration, part 1. In the example of FIG. 8, we have configured an ERP application system. The tasks in the BPR are represented by objects of a type 'SCREEN'. In the technical use case we would have here 'SERVICE' or 'OPERATION'. The task-id will be searched in an attribute of the screen object identified by 'TRANSACTIONCODE'. The transactioncode identifies the concrete screen in the application system and the BPR. So for example in a SAP ERP system the change order task has the transaction code VA02. So the link passed to DPHG would contain ERP and VA02. In the configuration is then specified that we have to look in the BPR for an object of type 'SCREEN' which has maintained the attribute 'TRANSACTIONCODE' with the value VA02.

The business functions are found by a navigation step from the task via a connection to an object of type 'FUNCTION'. When no types for connections are given, all connections will be considered.

We have also defined a second way to navigate to the business functions. In this case, we want to navigate in the first step to all models of type 'FUNCTION ALLOCATION DIAGRAM' which contain the task. In the second step we navigate from the model to the object, which has the model linked, and the object has to be of type 'FUNCTION'. To mention it again, the navigation is completely independent from the types. So, if you would like to have any other object type as a result, you can have it just by changing the type from 'FUNCTION' to the one you would like to have.

Referring now to FIG. 9, example code 901 for DPHG configuration, part 2 will be discussed and described. After we have defined how to get to the business functions, we can define how to find the process models, which are in this example the ones, which contain them and are of type 'EVENT PROCESS CHAIN' or 'BPMN PROCESS DIAGRAM'. In addition to that we also want to see the models of type 'FUNCTION ALLOCATION DIAGRAM' containing the task.

The help relevant objects are defined as BPR objects of type 'INFORMATION CARRIER', and 'EVENT'. Since no types for connections are specified, all objects are returned, that are connected to the business function by any connection type. Objects related to the task itself are in that example of no interest so the belonging block is left empty.

(C) DPHG Implementation

When implementing DPHG, use can be made of mainly three interfaces: one interface to access the configuration, one for accessing the BPR and of course the interface of the DPHG itself to provide the help information. The interface for accessing the configuration is discussed in connection with FIG. 14; the interface for accessing the BPR is discussed in connection with FIG. 15; and the interface of the DPHG is discussed in connection with FIG. 16 and FIG. 17.

IConfiguration API

The configuration can be part of the DPHG itself. A user may be able to get and set the configuration of the DPHG. Since we are using XML, we can define a schema to ensure that a well formed xml is passed. If the configuration is set (e.g. by placing a XML file in a directory or by calling a method setConfiguration( ) of the DPHG interface), the configuration can be parsed and the information can be made accessible through the following interface.

```
public interface IConfiguration
{
    String[ ] getTaskTypes( );
    String[ ] getTaskAttributes( );
    Step[ ][ ] getStepsForTasks2BusinessFunction( );
    Step[ ][ ] getStepsForBusinessFunctions2Help( );
    Step[ ][ ] getStepsForTasks2Help( );
    Step[ ][ ] getStepsForBusinessFunctions2Process( );
    Step[ ][ ] getStepsForTasks2Process( );
}
```

We can use two dimensional arrays because we can have more than one task or business function each having multiple steps. Note that when parsing the configuration for each contained application system, a configuration can be generated and stored in a map, so that you can simply get the configuration by, for example mapConfigurations.get(applicationSystemId)

Since the DPHG can support various BPRs, it can be important to provide abstract means for the navigation process within the BPR. The exact API functions, which the repository offers, might be called differently according to the implementation, but the functional requirement is expressed in the STEPKIND enumeration type.

The class Step can be, for example, a simple data container with the following information. Step kind identifies which BPR API call has to be executed for the result, depending on the values for 'to' and 'connectionkind' in the configuration.xml. The class contains also the list of types for filtering the BPR items.

```
public class Step {
    ...
    public enum STEPKIND {
        RelatedObjectByConnection,    // connectionkind
                                      "CONNECTION"
        ModelsContainingObject,       // to "MODEL"
                                      connectionkind="OCCURRENCE"
        ObjectsOfModel                //to='OBJECT'
                                      connectionkind="OCCURRENCE"
        LinkedModel,                  // to="MODEL"
                                      connectionkind="LINK"
        LinkedObject                  // to="OBJECT"
                                      connectionkind="LINK"
    }
    public STEPKIND getStepKind( ) {
        if (to.equals("MODEL") && cxnkind.equals("OCC")) {
            return STEPKIND.ModelsContainingObject;
        }
        ...
    }
    public String[ ] getTypes {...}
}
```

Figure 14:
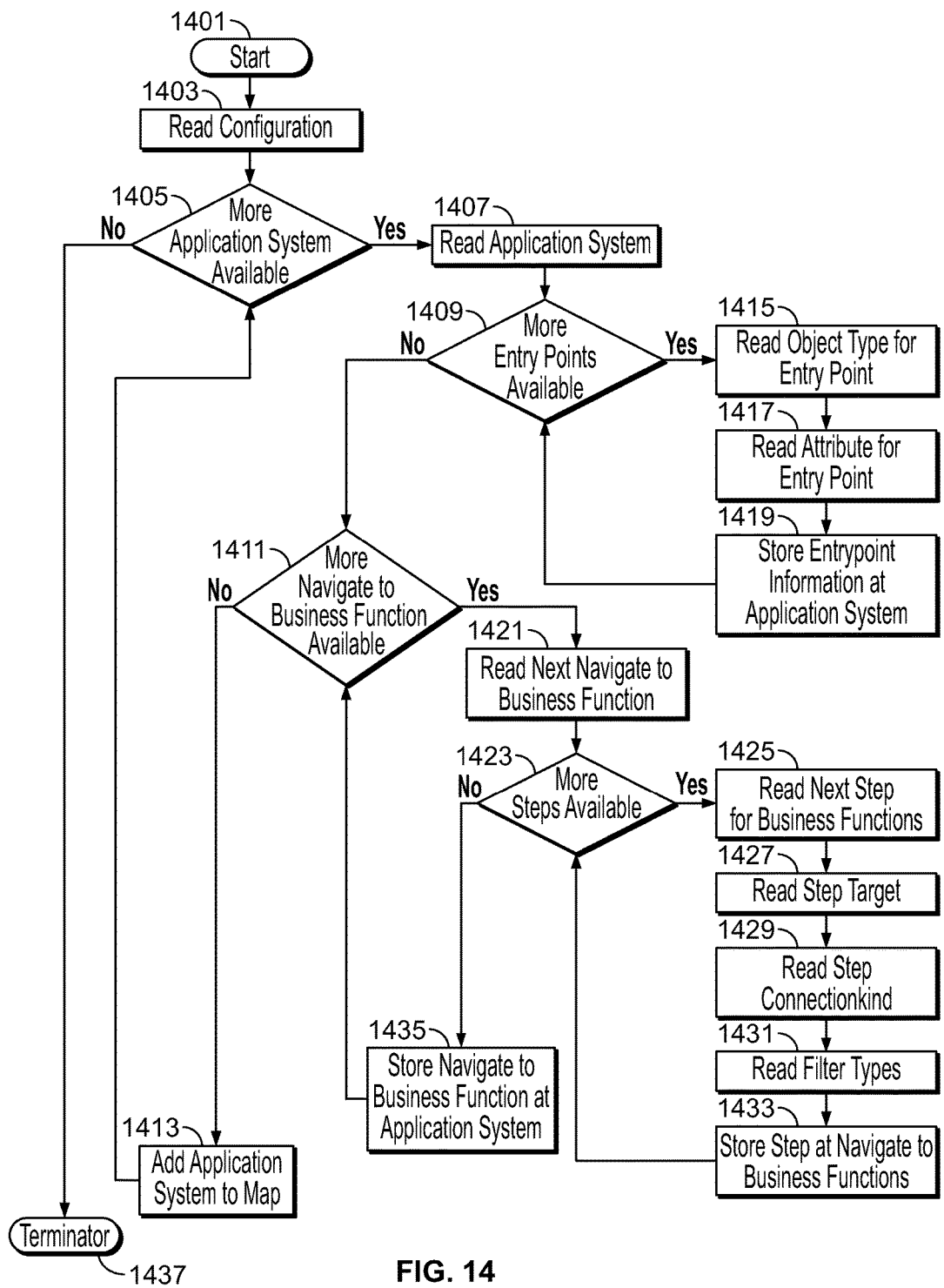
FIG. 14 is a flowchart of a process of reading and storing steps into a configuration for the tasks.

Referring now to FIG. 14, a flowchart of a process 1401 of reading and storing steps into a configuration for the tasks will be discussed and described. The process 1401 can be implemented on a processor appropriately configured, for example, the computer system of FIG. 11. Many of the details are discussed elsewhere herein and will not be repeated. The process 1401 includes reading 1403 the configuration. Then, in a loop, the process 1401 determines whether 1405 another application system is available in the configuration. If there is no other application system in the configuration, the process terminates 1437. If there is another application system in the configuration, then the process 1401 will read 1407 the application system. Then, in a loop, the process 1401 will determine whether 1409 there is another entry point available. If there is an entry point available, the process 1401 will read 1415 the object type for the entry point; read 1417 the attribute for the entry point; store 1419 the entry point information at the application system; and loop for the next entry point. If there are no more entry points available, the process 1401 will determine whether 1411 there is another navigate to business function available. If there is a navigate to business function available, the process will read 1421 the next navigate to business function; and for each of the steps available 1423 for the navigate to business function, the process 1421 will read 1425 the next step for business functions, read 1427 the step target, read 1429 the step connectionkind, read 1431 the filter types, and store 1433 the step at the navigate to business function. If there are no more steps available 1423, then the process 1401 will store 1435 the navigate to business function at the application system, and then loop to determine whether 1411 there are more navigate to business functions available. Once all navigate to business functions have been handled, the process 1401 will add 1413 the application system to the map, and loop to handle any more 1405 application systems available. Once there are no more application systems 1405, the process 1401 will terminate 1437.

IBPRAccess API

The second thing needed is access to the BPR. For each navigation step we have defined in the STEPKIND enumerationof the help system, we can define a method in an interface, referred to herein as "IBPRAccess," which abstracts from the different BPRs. In addition, that can be provided a method to connect to the BPR and to retrieve the tasks as entry points.

According to that, the interface can look as follows:

```
public interface IBPRAccess
{
    void connect(String userToken);
    List<IDPHGItem>
    getObjectByTypeAndAttribute(String taskObjectType, String
        taskIdAttributeType, String taskid);
    Map<IDPHGItem, List<IDPHGItem>>
    getRelatedObjectByConnection(List<IDPHGItem>
        source, String... cxnType);
    Map<IDPHGItem, List<IDPHGItem>>
    getModelsContainingObject(List<IDPHGItem>
        source, String... modelType);
    Map<IDPHGItem, List<IDPHGItem>>
    getObjectsFromModel(List<IDPHGItem> source,
        String... modelType);
    Map<IDPHGItem, List<IDPHGItem>>
    getLinkedModel(List<IDPHGItem> source,
        String... modelType);
    Map<IDPHGItem, List<IDPHGItem>>
    getLinkedObject(List<IDPHGItem> source,
        String... objectType)
}
```

Note that the implementation of the interface can be very BPR specific depending on the API which the BPR vendor provides specifically for the BPR. The interface can be designed to handle requests for multiple items for performance reasons. The dynamic aspect of the DPHG can be realized by using this API. Since the BPR is responsible for handling user rights and, of course, accessing the BPR, this allows the DPHG help system always to get the user specific, up-to-date information needed for DPHG.

The user may identify himself for the BPR with a user id and a password. Since the BPR might be capable of handling multiple languages also, a language might be required; the user then gets the result from the BPR in the language he used during login. In the BPR, at least in ARIS, you have access rights. How they're handled will of course depend on the BPR. In ARIS you would usually assign the user to a user group. The models and objects in the BPR can be assigned to groups or folders. These groups have also the access rights of the user groups assigned, so that you can define for each group or folder which user group is allowed to see the content of which group or folder. But this might be completely different in other BPRs. So revisiting the example with the technical application and the ERP application, the user using the ERP application would not be able to see the help for the technical application, if he has no rights to access the BPR objects like 'service' or 'operation'. The same apply to all objects which might be visited when executing the steps. If he has not the access right to read such an object, the BPR would not return that object and it is not shown in the generated help.

The objects exchanged through this API implement only a lean interface. This is sufficient because the DPHG only collects the relevant items and passes them to the renderer.

```
public interface IDPHGItem
{
    String getId( );            //unique BPR id
    String getParentId( ); //unique BPR id of the parent item
    String getName( );          //display name of the item
    String getType( );          //type of the item (function ...,
                                  event process chain ...)
}
```

The getParentId is used to identify to which item it belongs. So if you want to show all process models to a business function, the items representing the process model will have the business function's id as parentid. This allows you to group items in the renderer in an arbitrary way.

With the BPR API interface, each possible step defined in the configuration can be executed one after the other, since we have defined in the interface a method for each kind of step. Using the result set from the previous step as input for the next one until the last step is executed, we get the final result set containing the requested help items.

Using the getModelsContainingObject method as an example, an implementation of this interface could look like the following:

```
import bprvendor.api.*
...
List getModelContainingObject(IDPHGObject object, String types...)
{
    bprvendor.Object[ ] objVendor = bprvendor.getObject(object.getId( ));
    bprvendor.Occurence[ ] occs = bprvendor.getOccurencesOfObject( );
    List listModels = new ArrayList( );
    for (occ : occs) {
        if (bprvendor.getModelForOccurence(occ).hasType(types))
            listModels.add(bprvendor.getModelForOccurence(occ));
    }
    return convertVendorObjectsToDPHGObjects(listModels);
}
...
```

Figure 15:
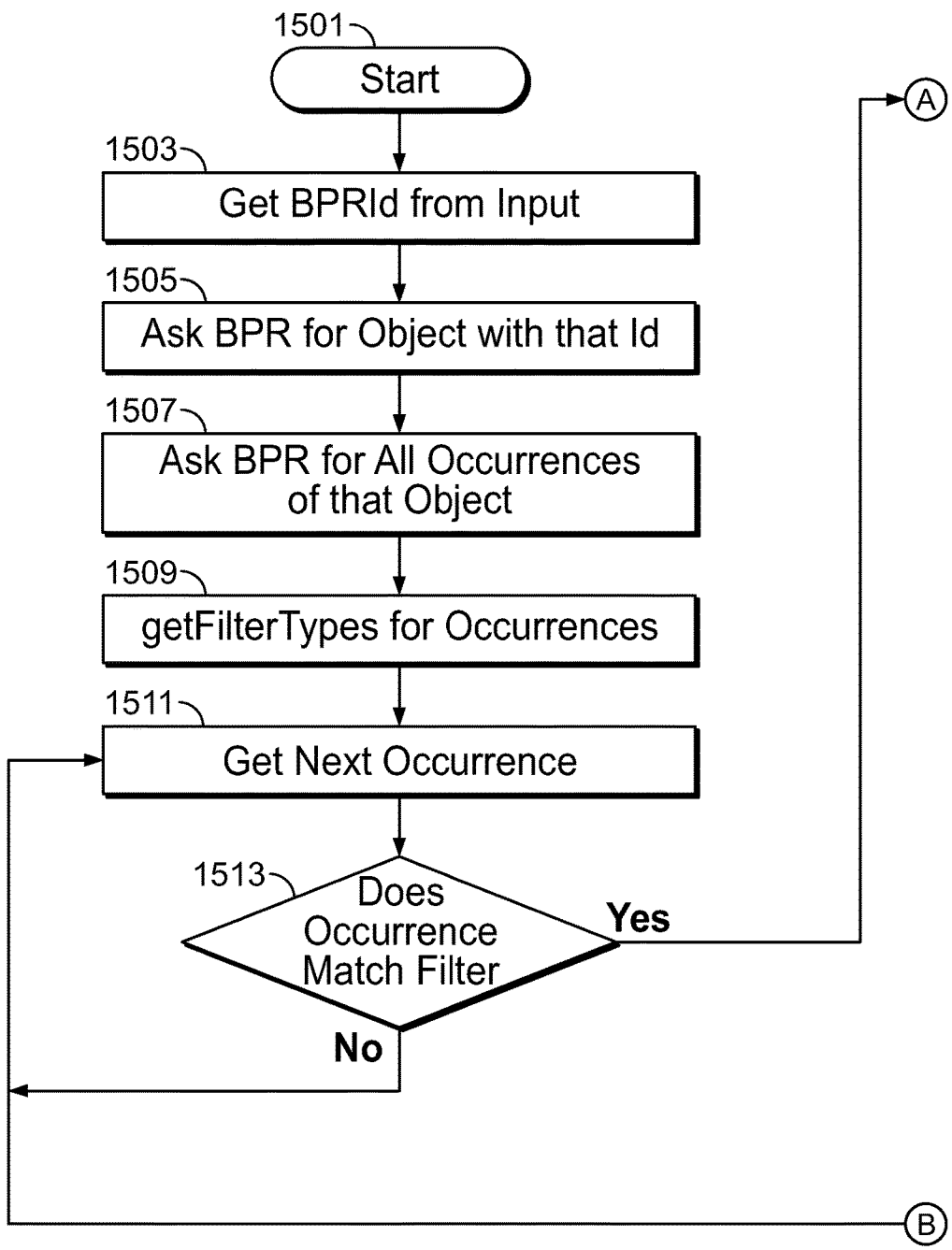
FIG. 15 is a flowchart of a process for a BPR access API.
Figure 15:
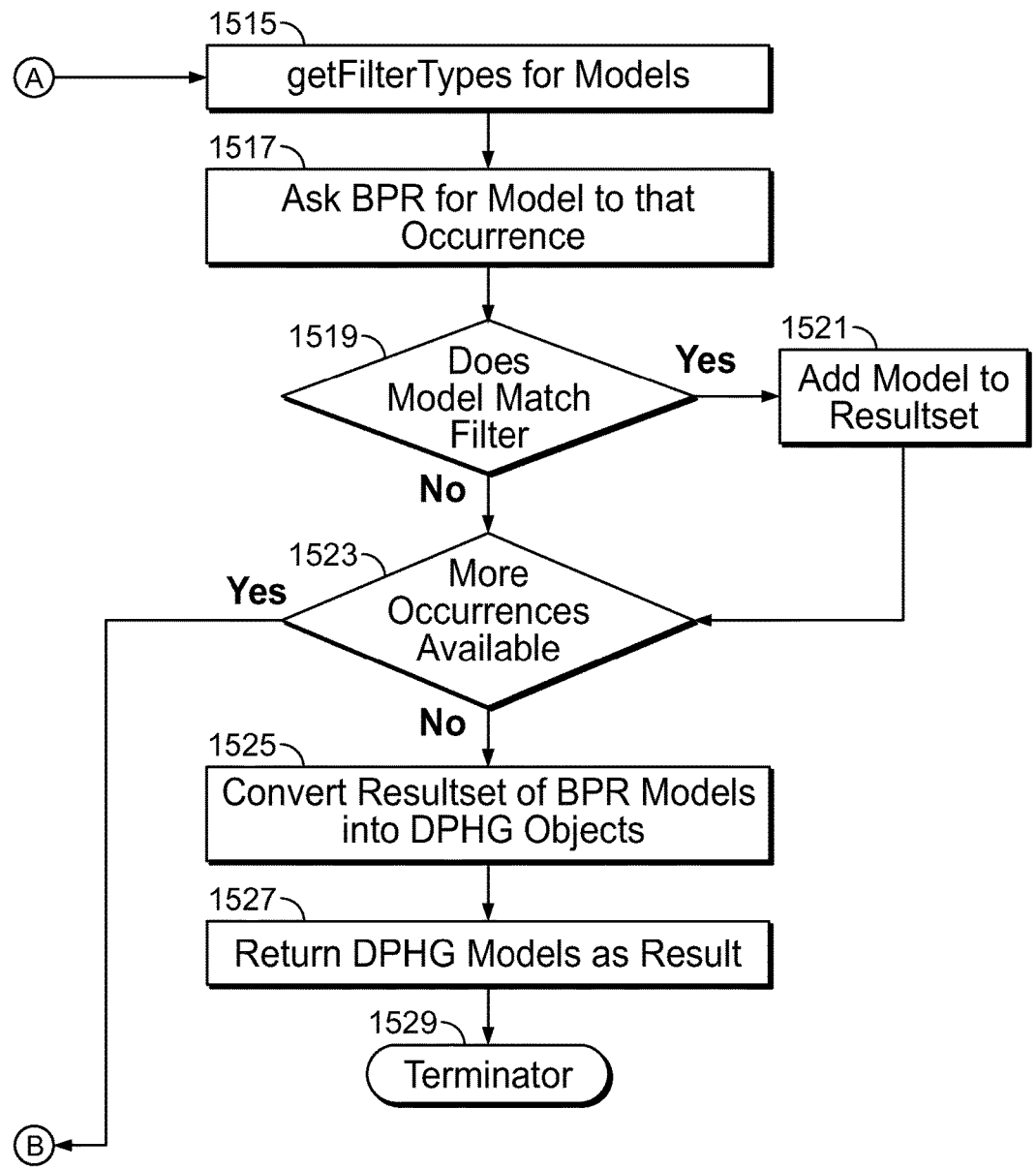

Referring now to FIG. 15, a flowchart of a process for a BPR access API will be discussed and described. The process 1501 can be implemented on a processor appropriately configured, for example, the computer system of FIG. 11. Many of the details are discussed elsewhere herein and will not be repeated. The process 1501 will get 1503 a BPRid from the input, then ask 1505 the BPR for an object with that id, and then ask 1507 the BPR for all occurrences of that object, and then get 1509 the filter types (e.g., by performing a getFilterTypes call) for those occurrences. Then, the process 1501 will loop through the occurrences to determine 1513 whether the occurrence matches the filter. For each occurrence that matches the filter, the process 1501 will get 1515 the filter types for the models (e.g., by performing a getFilterTypes call); ask 1517 the BPR for a model to that occurrence; determine whether 1519 the model matches the filter and if so, add 1521 the model to the resultset. Then, the process will loop to the next occurrence 1511. When there is no more occurrence available 1523, then the process 1501 will convert 1525 the resultset of the BPR models into DPHG objects, and return 1527 the DPHG models as a result. The process 1501 can then terminate 1529.

Public DPHG API

While the above-described APIs are used internally, the DPHG can provide a public API to give the DPHG renderer access to the items relevant for the help. It also gives you access to the configuration itself. This has the advantage that you are able to write an own editor for the DPHG configuration if you do not want to deal with the xml structure itself.

```
public interface IDPHGAccess
{
    String getSessionId(String sUserToken);
    void disconnect(String sSessionId)
    List<IDPHGItem> getTasks(String sApplicationSystemId, String
        sTaskId, String sSessionId);
    List<IDPHGItem> getHelpContentForTask(IDPHGItem task, String
        sApplicationSystemId, String sSessionId);
    List<List<IDPHGItem>>
    getBusinessFunctionsWithProcessForTask(IDPHGItem task,
        String sApplicationSystemId, String sSessionId);
    List<IDPHGItem> getHelpContentForBusinessFunction(IDPHGItem
        businessfunction, String sApplicationSystemId, String
        sSessionId);
    List<IDPHGItem> getAllHelpContentOfType(String sType, String
        sApplicationSystemId, String sSessionId);
    void setConfiguration(String sConfiguration);
    String getConfiguration( );
}
```

Note that the interface is designed in a way to give the user not all help information at once, but instead to deliver the help information on demand. That allows the DPHG renderer to show first some overview and get the detailed information later on. This has, of course, performance reasons.

The following will focus in the following on the parts of DPHG which are relevant for the help generation and will omit user management and session handling which can be implemented in accordance with conventional techniques. Assume there is provided a mechanism that, after connecting to the BPR, assigns a BPR interface to a sessionId, so there is no permanent logon/off to the BPR, especially if usergroups are assigned in the usertoken passed to DPHG (by assigning all users to a few user groups, the BPR'S access right management can be much easier).

The easiest method to implement is getTasks because it has no navigation over BPR objects but it gives the user an impression about the IConfig interface. The information from the DPHG configuration is read once DPHG is instantiated. There is one IConfiguration per application system available in the user's configuration.

```
List<IDPHGItem> getTasks(String sApplicationSystemId, String sTaskId,
String sSessionId);
{
    IBPRAccess bpr = getBPRForSession(sSessionId);
    IConfiguration config =
    getConfigurationForSystem(sApplicationSystemId);
    String sTaskType = config.getTaskType( );
    List<String> sAttrType = config.getTaskAttrType( );
    return bpr.getObjectByTypeAndAttribute(sTaskType, sAttrType,
    sTaskId);
}
```

The methods getTaskType and getTaskAttrType apply to the elements task_type and attribute of the configuration.

Figure 16:
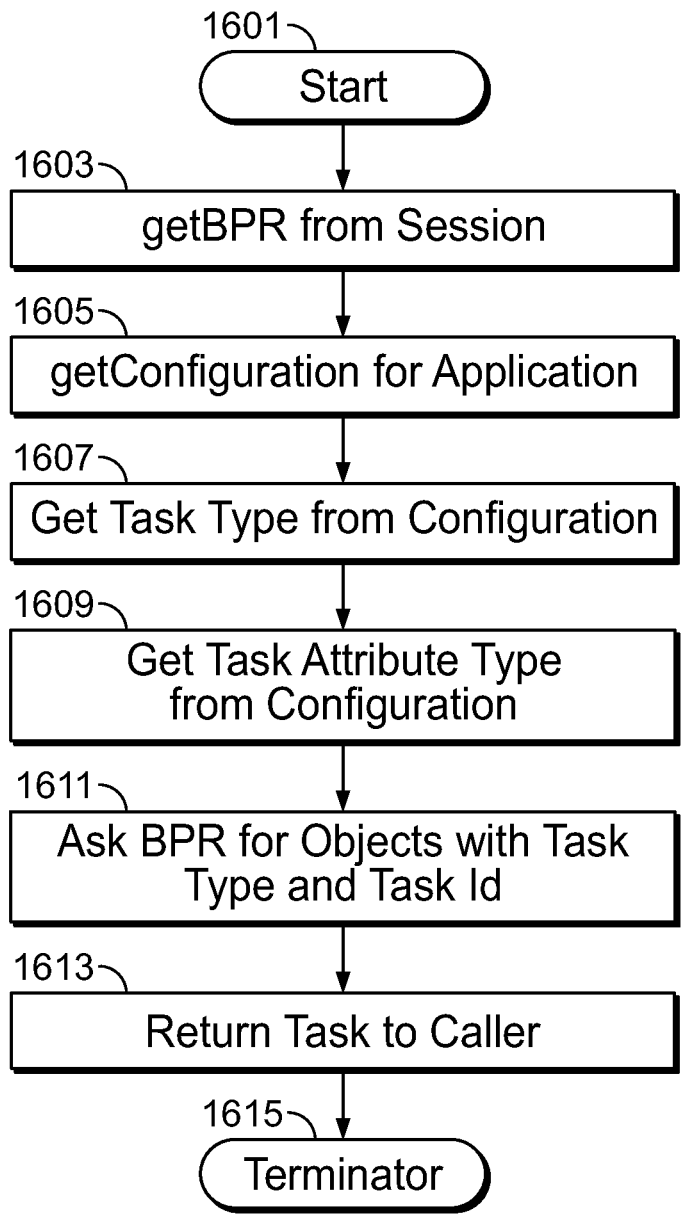
FIG. 16 is a flowchart of a process of getting a task from the DPHG.

Referring now to FIG. 16, a flowchart of a process of getting a task from the DPHG will be discussed and described. The process 1601 can be implemented on a processor appropriately configured, for example, the computer system of FIG. 11. Many of the details are discussed elsewhere herein and will not be repeated. The process 1601 will get 1603 the BPR (getBPR) from a session; then get 1605 the configuration (getConfiguration) for the application; then get 1607 the task type from the configuration; then get 1609 the task attribute type from the configuration; then ask 1611 the BPR for objects with the task type and the task id; then return 1613 the task to the caller; and then terminate 1615.

More interesting are the methods which have to navigate over the BPR.

```
List<List<IDPHGItem>>
getBusinessFunctionsWithProcessForTask(IDPHGItem task, String
sApplicationSystemId, String sSessionId);
{
    IBPPvAccess bpr = getBPRForSession(sSessionId);
    IConfiguration config =
    getConfigurationForSystem(sApplicationSystemId);
    List<Step> steps = config.getStepsForGetBusinessFunctions( );
    List<IDPHGItem> result = executeStep(steps.next( ), task);
    while (steps.hasNext( ))
    {
        result = executeStep(steps.next( ), result);
    }
    //do the same iteration to add helprelevantmodels to the result
    ...
}
```

In the executeStep method the STEPKIND is evaluated and the types are passed to the matching BPR API method.

With this implementation we are able to collect arbitrary information from any BPR with regard to any application system.

Figure 17:
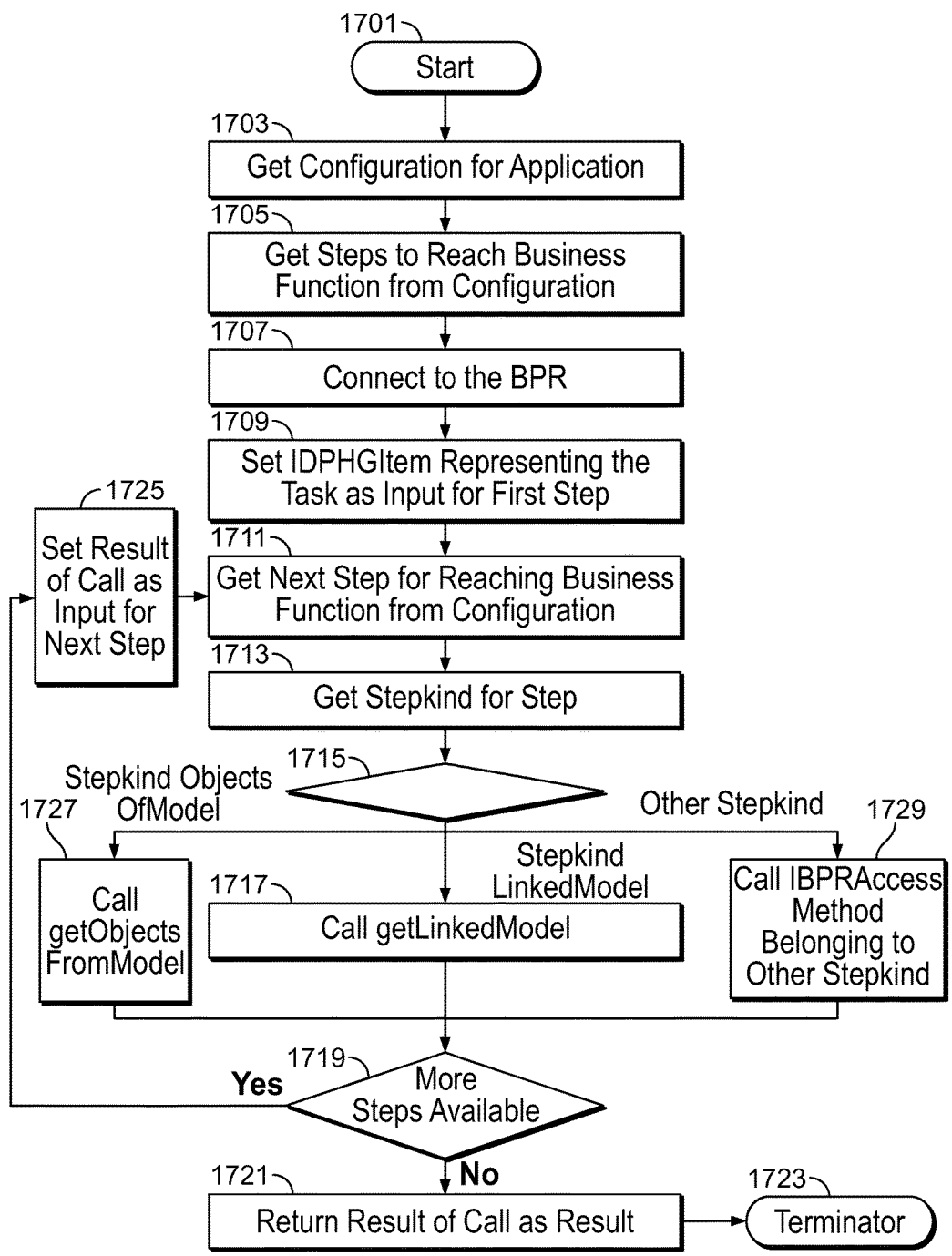
FIG. 17 is a flowchart of a process of navigating through the BPR.

Referring now to FIG. 17, a flowchart of a process of navigating through the BPR will be discussed and described. The process 1701 can be implemented on a processor appropriately configured, for example, the computer system of FIG. 11. Many of the details are discussed elsewhere herein and will not be repeated. The process 1701 will get 1703 the configuration for the application; get 1705 the steps to reach the business function from the configuration; then connect 1707 to the BPR; and then set an IDPHGItem representing the task as input for a first step. The process 1701 will then get 1711 a next step for reaching the business function from the configuration; get 1713 the stepkind for the step; and determine 1715 the stepkind. For a stepkind of ObjectsOfModel, the process 1701 can call 1727 the getObjectsFromModel. For a stepkind of LinkedModel, the process 1701 can call 1717 the getLinkedModel. For any other stepkind, the process 1701 can call 1729 the IBPRAccess method belonging to the other stepkind. If there are more 1719 steps available, the process 1701 will set 1725 the result of the call as input for the next step, and then loop to get the next stepkind for the next step and repeat. If there are no more 1719 steps available, then the process 1701 can return 1721 the result of the call as a result, and then terminate 1723.

(D) Visualizing the Help

Renderer

In the same way as the BPR access is very BPR dependent, the DPHG renderer is also very BPR dependent. The dynamic process help renderer has to use, of course, the public API of the DPHG to get the items to display to the user.

It is assumed that the DPHG renderer is embedded in an environment that is capable to display objects and models. Using the API of the DPHG, the renderer generates a view visualized on a display, which lets a user browse through the results of the calls.

Figure 10:
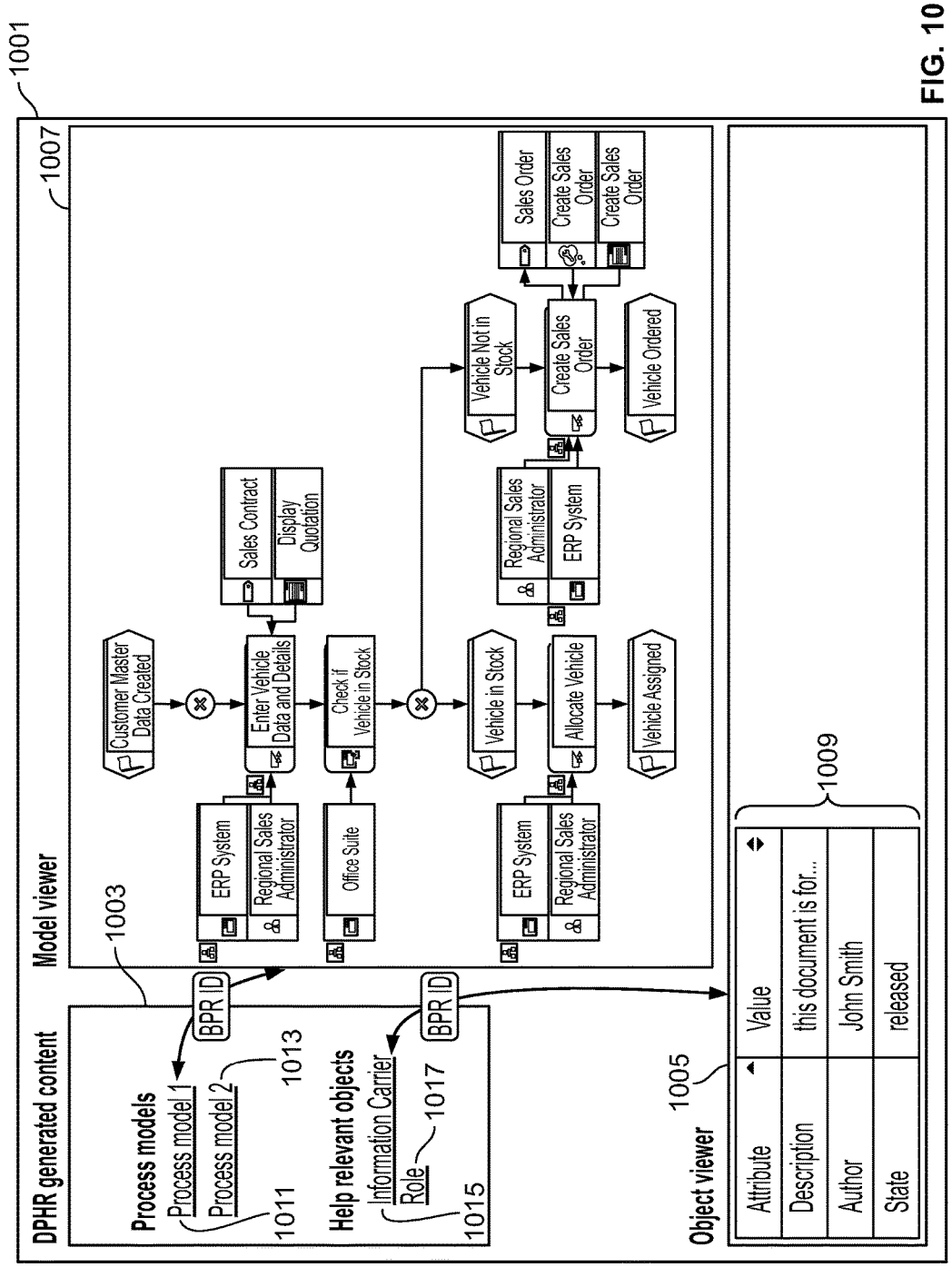
FIG. 10 is a diagram illustrating a rendered view in which content triggers viewer controls.

Referring now to FIG. 10, a diagram illustrating a rendered view in which content triggers viewer controls will be discussed and described. At this point, the DPHG renderer has generated information to be visualized on a display 1001. The display can include a view of the content generated by the DPHG, here the "DPHR generated content" window 1003; a view of the model, here the "model viewer" window 1007; and/or a view of the object(s), here the "Object viewer" window 1005.

The renderer can arrange the items to be viewed as desired, according to known techniques. Each of the items, here, regarding the process model 1 1011, process model 2 1013, information carrier 1015, and role 1017 (listed in the

```
private List<IDPHGItem> executeStep(Step step, List<IDPHGItem> listInput)
{
    List<IDPHGItem> result = new ArrayList<IDPHGItem>( );
    switch (step.getStepKind( ))
    {
        case RelatedObjectByConnection:
        {
            result.addAll(getBPR(sessionId).getRelatedObjectByConnection(listInput,
                step.getTypes( )).values( ));
        }
        case...
    }
}
```

DPHR generated content window), can be associated with the id assigned to the used BPR object, which can be passed to the environment by clicking on a rendered item (a link) to trigger detailed views, for example, diagrams of the model shown in the model viewer window 1007 and/or object properties, for example attributes 1009, listed in the Object viewer window 1005.

Depending on the user preferences the renderer could provide different options on how to present the result of the process help. That may range from just showing the process models to a more complex grouping of DPHG content on different tabs or even a tree structure, where the content is shown hierarchically. Also templates for used colors or fonts could be provided by the renderer to format different types of DPHG content in different ways.

Note that you could also add the renderer itself as application to the configuration of the DPHG to achieve a maximum of flexibility.

It will be noted that the model illustrated in the model viewer window 1007 shown in the example of FIG. 10 corresponds to the example ARIS model of FIG. 1. That is, a visualization of the model shown in the model viewer can be the same as provided by the BPM, with the limitation to the system/task, as discussed above.

The details of the object in the object viewer window 1005 correspond to detailed descriptions maintained in the attributes for the selected object. The selected object can be a role, an information carrier, or a task of an application system.

Both model viewer 1007 and object viewer 1005 can be part of the environment and can be triggered by selection of the BPR id, for example when the user clicks on one of the rendered links from the DPHG listed in the DPHR generated content window 1003. Note that the user can be absolutely free on how to use DPHG. For example, light weight web technologies can be used, as well as a JAVA programming language application for example using Swing.

Figure 18:
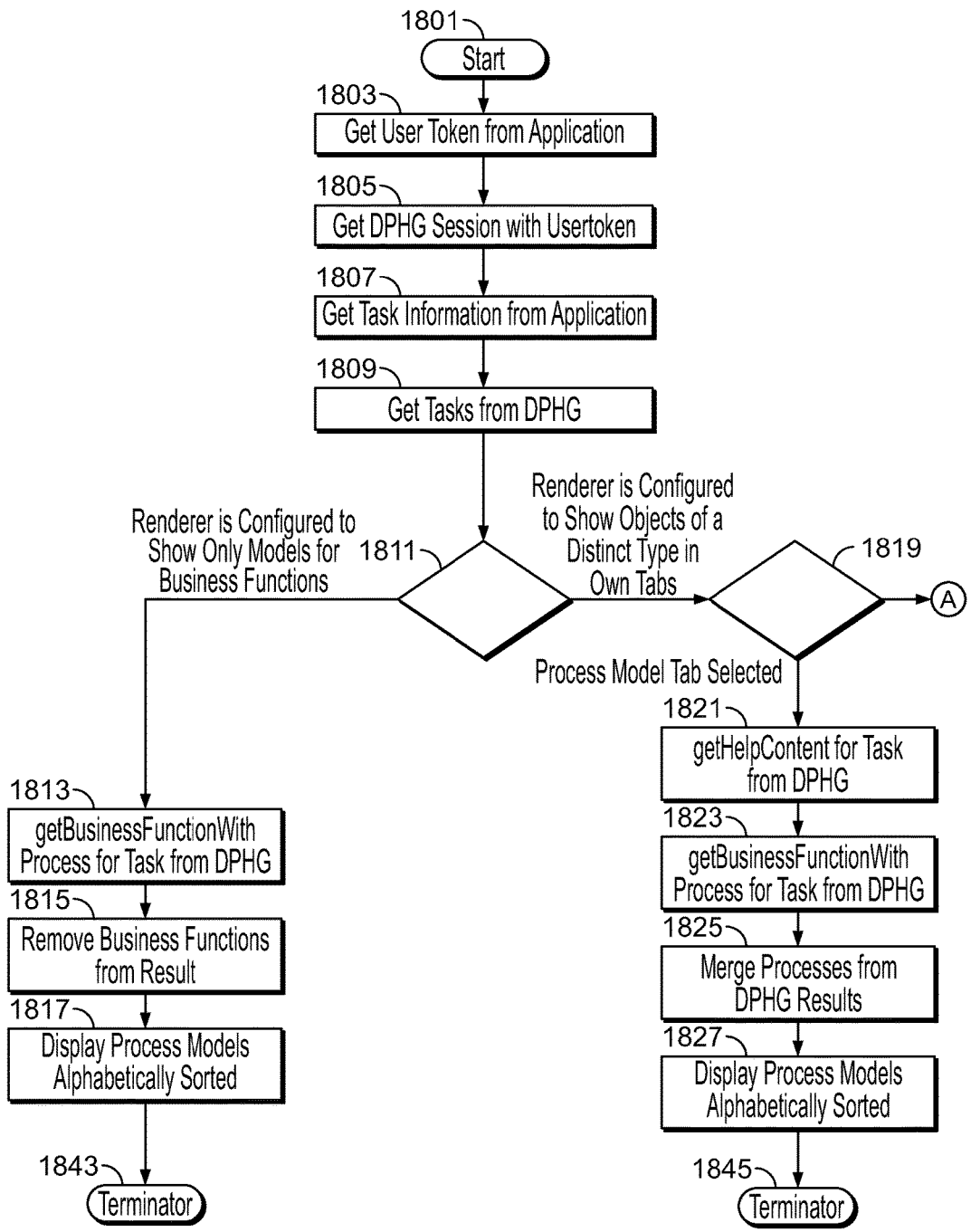
FIG. 18 is a flowchart of a process for rendering content using the DPHG.
Figure 18:
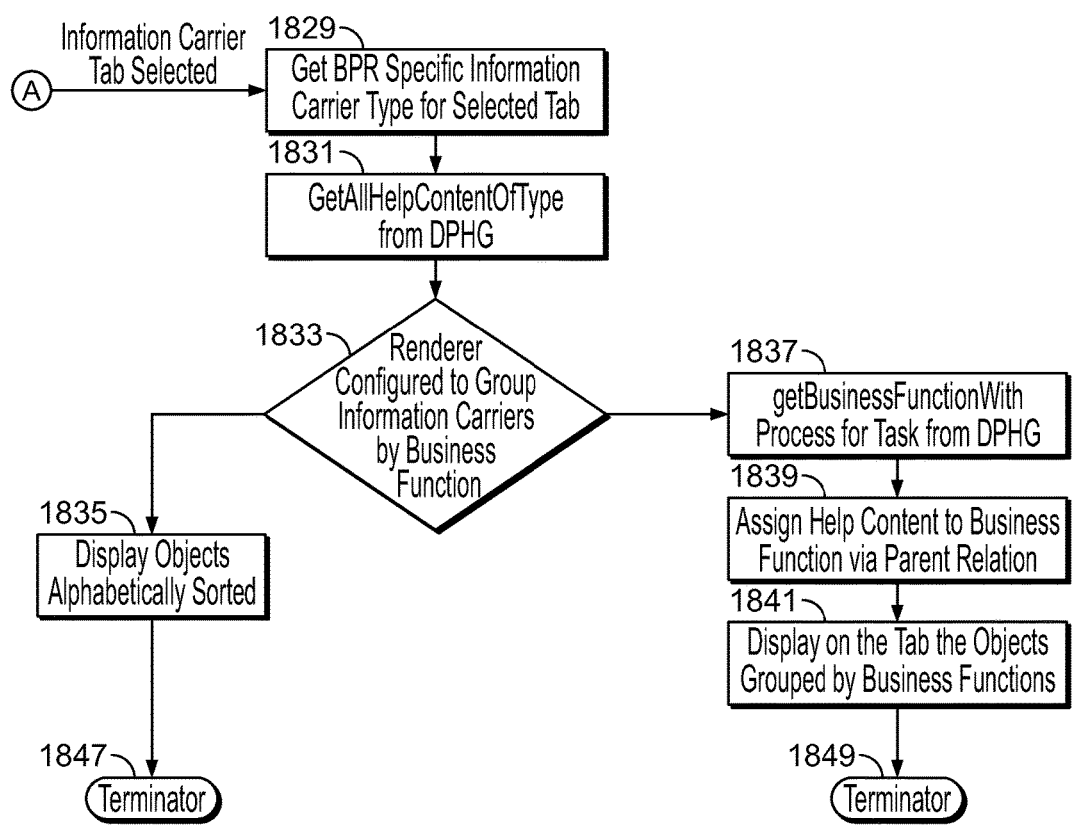

Referring now to FIG. 18, a flowchart of a process for rendering content using the DPHG will be discussed and described. In this example, there are illustrated different ways to render the content. The process 1801 can be implemented on a processor appropriately configured, for example, the computer system of FIG. 11. Many of the details are discussed elsewhere herein and will not be repeated. The process 1801 can get 1803 a user token from the application; get 1805 a DPHG session with the usertoken; get 1807 Task information from the application; and get 1809 tasks from the DPHG. The process 1801 can determine 1811 how the renderer is configured to show objects/models. If it is determined that the renderer is configured to show only models for business functions, the process 1801 can get 1813 the business function for the task from the DPHG (e.g., perform a getBusinessFunctionWithProcess); remove 1815 the business functions from the result; display 1817 the process models, e.g., alphabetically sorted; and then terminate 1843. If it is determined that the renderer is configured to show objects of a distinct type in their own tabs, the process 1801 can determine 1819 whether the user has selected process model or information carrier, e.g., by selecting a respective process model tab or an information carrier tab. When the process model tab is selected, the process 1801 can get the help content (e.g., getHelpContent) for the task from the DPHG; get 1823 the business function with the process (e.g., getBusinessFunctionWithProcess) for the task from the DPHG; merge 1825 processes from the DPHG results; display 1827 the process models, for example, alphabetically sorted; and then terminate 1845. When the information carrier tab is selected, the process 1801 can get 1829 BPR specific information carrier type for the selected tab; get 1831 all of the help content for the type (e.g., getAllHelpContentOfType) from the DPHG; determine whether 1833 the renderer is configured to group information carriers by business function; when the renderer is not so configured, the process 1801 can display 1835 the objects, e.g., sorted alphabetically and then terminate 1847; when the renderer is so configured, the process 1801 can get 1837 the business function with the process (e.g., getBusinessFunctionWithProcess) for the task from the DPHG; assign 1839 help content to the business function via a parent relation; display 1841, e.g., on the tab, the objects, e.g., grouped by business function; and then terminate 1849.

An example for using the DPHG inside the renderer could look like this.

```
function buildList( )
{
    var task = dphg.getTasks(ApplSystemId, sTaskId,
    sSessionId).get(0);
    var overview = getBusinessFunctionsWithProcessForTask(task,
            ApplSystemId, sSessionId);
    var helpRelvantObjects = dphg.getHelpContentForTask(task,
    ApplSystemId,
            String sSessionId);
    dphgControl.add(overview, helpRelvantObjects);
}
function dphgClick( ) {
    var dphgItem = dphgControl.getClickedItem( );
    if (dphgItem.getType( ).startsWith("OT")) {
            bprenvironmentObjectViewer.show(dphgItem.getId( ));
    }
    else     {
            bprenvironmentModelViewer.show(dphgItem.getId( ));
    }
}
```

The buildList function can get the task from the DPHG, retrieve for the task the associated process models and help objects, and pass them to a control which displays the associated process models and help objects. When clicking on an item in the control, the BPR id can be retrieved from the DPGHItem and passed to a control for displaying the object or the model respectively.

Calling the Process Help From End User Perspective

How the DPHG integrates with one or more application systems depends, of course, on the capability for customizing the used system.

For a highly customizable system, there can be a very deep integration because the F1 help can be customized to show the process help (in addition or as an alternative to the classic help). For other systems where this is not possible, a browser plugin, for example, the search engine management in Firefox or other browsers, can be added to provide the help; and/or help can be added to be requested from a system.

So what would DPHG help look like? For a highly customizable application system, the administrator of the system can maintain data for the user token needed for DPHG to connect to the BPR respectively to connect to DPHG itself if necessary.

The end user working with this application system has the screen open where he can change the order. A customer has asked for a sales discount of 10% otherwise he would cancel the order. The end user tries to enter the discount but gets a message that this is not possible.

Then the end user can select help, for example, by pressing a help button, such as F1 in the application system, to request help, as is traditional. The customization provided in the help request can initiate a retrieval of the information for the task which is currently in process in the application system, can get the task id, can generate the link (discussed for example above) based on the maintained data given by the admin, and can execute the link.

For a URL based link, a browser can open, can pass the link to the web server which embeds the renderer and the DPHG, the renderer can call the DPHG using the public API of DPHG to get the help relevant content, can render the content and return a web page containing the process help back to the browser. The user now sees the processes relevant to the change order which include a process change order with discounting. He clicks on that model and the renderer opens the model viewer so that he can see how the process of discounting a sales order works. He sees first that a discount above 5% is only possible if the order volume is larger than 100 k$. He also sees that there is a branch in the process, where this is possible but the order needs to have a special flag for that, which can only be set by particular managers. Since he only wants the best for the customer he decides not to cancel the order, but to check for the particular managers. In the process there is a connection from the function 'allow discount for small orders' to an object of type person group. He clicks on that object in the model viewer, and gets the list of persons which belong to that person group. (In the BPR there is connection 'belongs to' between objects of type 'Person group' and 'Person', and a connection of type 'is responsible for' between 'Function' and 'Person group'). He chooses a person, clicks on it and sees the phone number, an attribute of the person object in the BPR. He calls, the manager gives his okay, sets the flag, and the user is now able to set the discount to 10%.

However since the renderer was also configured to show the associated training documents maintained in the BPR, he takes a look at it and sees, that his line manager would automatically receive a notification about order cancelling. Another related document tells him, that his bonus is related to the amount of canceled orders. All these information are process related and have nothing to do with the application system itself, which is just the tool that supports you in the process.

Note that this is possible by having the DPHG, because only the DPHG is able to identify with his configuration the relevant process to the task coming from the application system.

Figure 19:
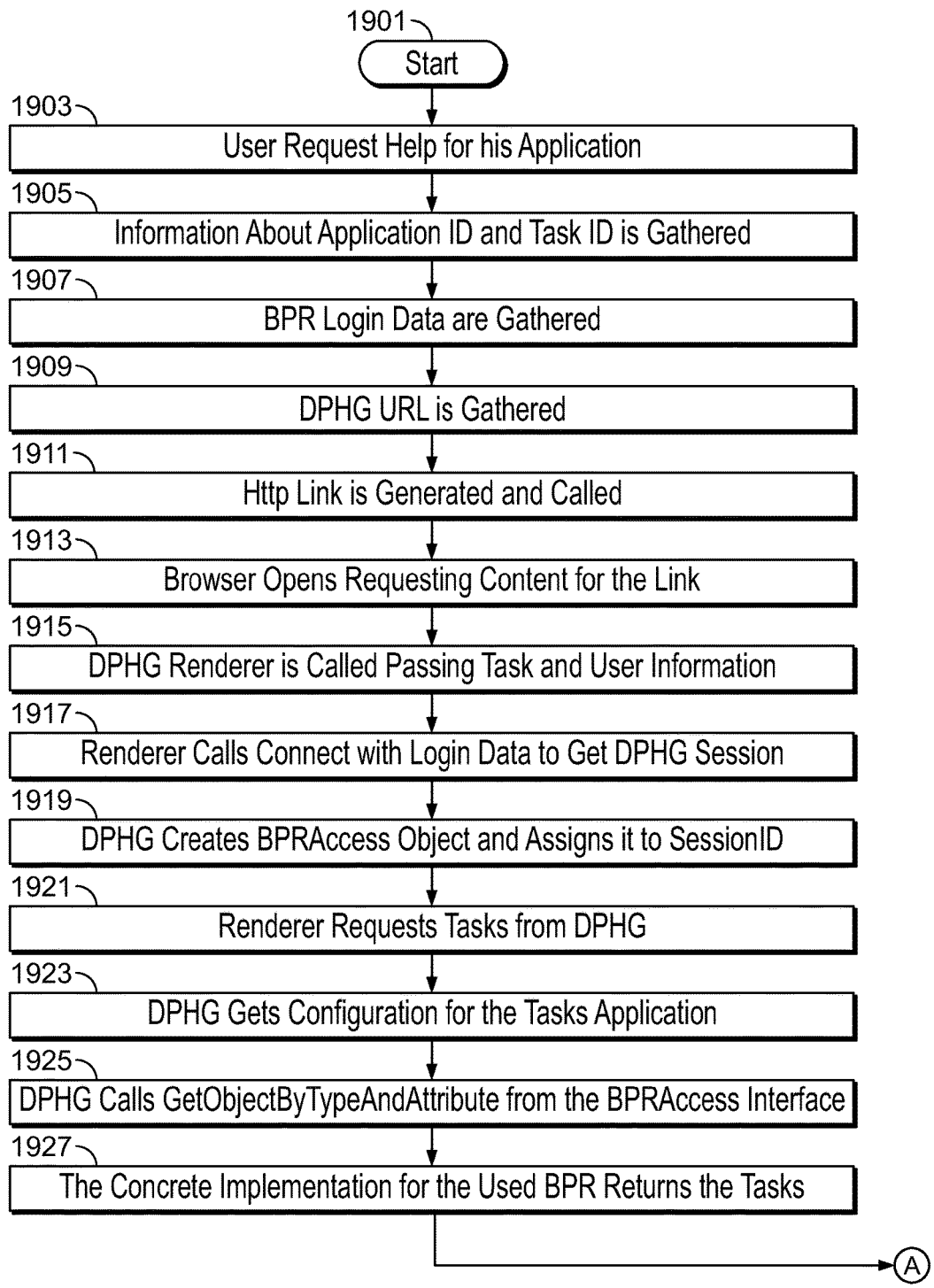
FIG. 19 is a flowchart of an end to end scenario of a case of having an HTML based renderer.
Figure 19:
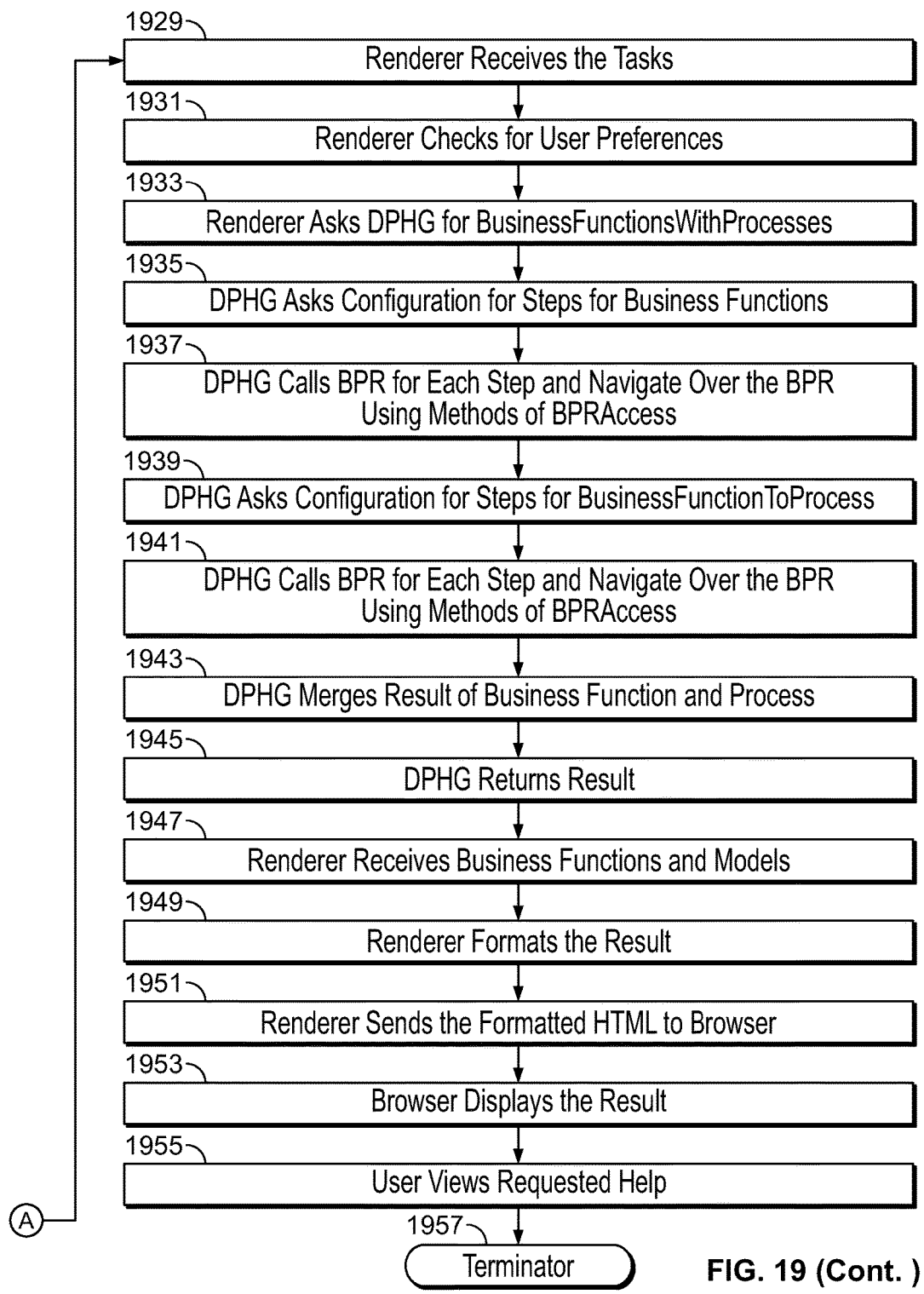

Referring now to FIG. 19, a flowchart of an end to end scenario of a case of having an HTML based renderer will be discussed and described. The process 1901 can be implemented on a processor appropriately configured, for example, the computer system of FIG. 11. Many of the details are discussed elsewhere herein and will not be repeated. In the process 1901, the user 1903 can request help for his/her application. Then, the process 1901 can gather 1905 information about the application id and the task id; gather BPR login data 1907; gather the DPHG URL; and generate 1911 an http link and call it. In the process, a browser 1913 can open the requesting content for the link. Then, the process 1901 will call 1915 the DPHG renderer, passing the task and user information. Then, in the process 1901, the renderer calls 1917 connect with the login data to get the DPHG session. In the process 1901, the DPHG 1919 creates a BPRAccess object and assigns it to a sessionid. Then, in the process 1901, the renderer 1921 requests tasks from the DPHG. Then, the DPHG 1923 gets the configuration for the tasks application; the DPHG calls 1925 getObhectByTypeAndAttribute from the BPRAccess interface; and then the process returns 1927 the tasks, from the concrete implementation for the used BPR. Then, in the process 1901, the renderer 1929 receives the tasks; checks 1931 for user preferences; and asks 1933 a DPHG for BusinessFunctionsWithProcesses. Then, in the process 1901, the DPHG asks 1935 the configuration for steps for business functions; calls 1937 the BPR for each step and navigates over the BPR using methods of BPRAccess; asks 1939 the configuration for steps for the BusinessFunctionToProcess; calls 1941 the BPR for each step and navigates over the BPR using methods of BPRAccess; merges 1943 the result of business function and process; and then returns 1945 the result. Then, in the process 1901, the renderer receives 1947 the business functions and models; formats 1949 the result; and sends 1951 the formatted result, e.g., as HTML, to the browser of the user. Then in the process 1901, the browser of the user displays 1953 the result, which is provided so that the user 1955 can view the requested help. Then the process 1901 can terminate.

5. Recapitulation

Figure 11:
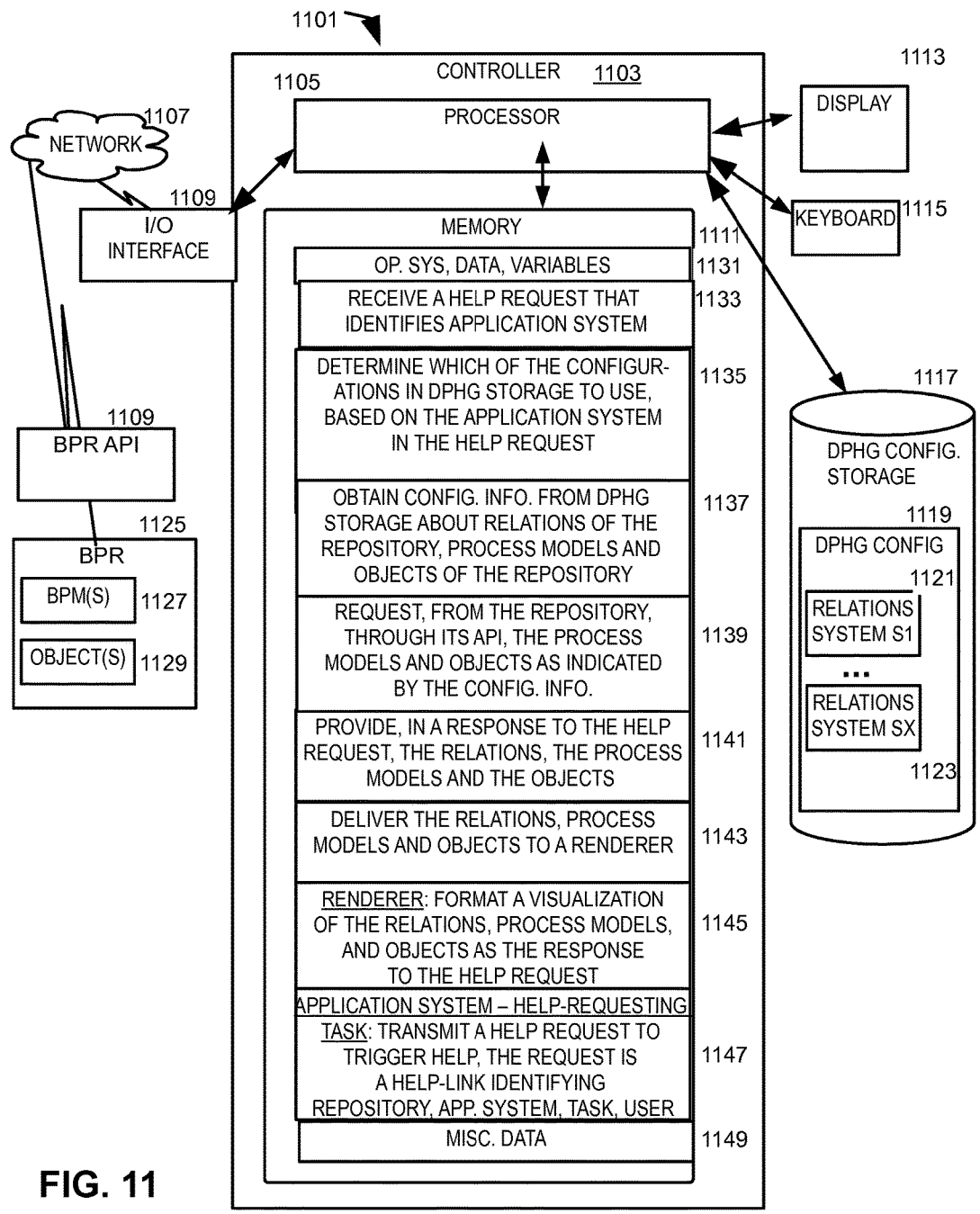
FIG. 11 is a block diagram that depicts relevant portions of a computer system.

Referring now to FIG. 11, a block diagram that depicts relevant portions of a computer system will be discussed and described. The computer system 1101 may include one or more controllers 1103, a processor 1105, an input/output (i/o) interface 1109 for communication such as with a network 1107, a memory 1111, a display 1113 (optional), and/or a user input device such as a keyboard 1115. Alternatively, or in addition to the keyboard 1115, a user input device may comprise one or more of various known input devices, such as a keypad, a computer mouse, a touchpad, a touch screen, a trackball, and/or a keyboard. The display 1113 may present information to the user by way of a conventional liquid crystal display (LCD) or other visual display, and/or by way of a conventional audible device (e.g., a speaker) for playing out audible messages. Portions of the computer system 1101 are well understood to those of skill in this area and have been omitted to avoid obscuring the discussion.

The processor 1105 may comprise one or more microprocessors and/or one or more digital signal processors. The memory 1111 may be coupled to the processor 1105 and may comprise a read-only memory (ROM), a random-access memory (RAM), a programmable ROM (PROM), and/or an electrically erasable read-only memory (EEPROM). The memory 1111 may include multiple memory locations for storing, among other things, an operating system, data and variables 1131 for programs executed by the processor 1105; computer programs for causing the processor to operate in connection with various functions such as to receive 1133 a help request, to determine 1135 which of the configuration to use, to obtain 1137 configuration information about relevant information in the repository 1125, to request 1139 process models and objects from the repository, to provide 1141 the response to the help request, to deliver 1143 the relations, process models and objects to a renderer, to format 1145 a visualization, and to transmit 1147 the help request to trigger the help. The computer programs may be stored, for example, in ROM or PROM and may direct the processor 1105 in controlling the operation of the computer 1401. Each of these functions is considered in more detail herein, to the extent that it is not detailed elsewhere in this document.

The user may invoke functions accessible through the user input device such as the keyboard 1115. The user input device may comprise one or more of various known input devices, such as a keyboard (1115, illustrated) and/or a pointing device, such as a mouse; the keyboard 1115 may be supplemented or replaced with a scanner, card reader, or other data input device; and the pointing device may be a mouse, touch pad control device, track ball device, or any other type of pointing device.

Responsive to manual signaling from the user input device represented by the keyboard 1115, in accordance with instructions stored in memory 1111, and/or automatically upon receipt of certain information via the i/o interface 1109, the processor 1105 may direct the execution of the stored programs.

The computer 1101 can access, via an API 1109, a repository (here represented by BPR 1125) on which is stored one or more process models, here represented by BPM(s) 11127; and one or more objects 1129. Although the BPR and its API 1109, 1125 are illustrated as accessed over the network 1107, the BPR and/or its API may be remotely and/or locally accessible from the computer 1101, over a wired and/or wireless connection, and/or may be provided on the locally on the computer 1101 or local storage connected thereto (not illustrated). Techniques are known for accessing, through an API 1109, information in the BPR 1125.

It may be noted that the computer programs stored in the memory 1111, including those generally part of the DPHG, the Renderer, and the Application System-Help Requesting Task, are illustrated on the controller 1103. In other embodiments, the DPHG, the Renderer, and/or the application system, and/or one or more of the computer programs conveniently may be distributed to one or more other processors. In such a situation, the controller 1103 may omit those computer programs which are provided on another processor.

The processor 1105 may be programmed to receive 1133 a help request, to trigger the help. The help request can include information that identifies the application system for which the help is requested. Typically, a user is executing the application system and then requests help from the application system, probably using a known help user interface (such as the <F1> key or a help button). Instead of triggering the help which is distributed with the application system itself, the help request is received by the DPHG system/method described herein, so as to refer instead to the process model description of the application system, the objects in the repository, and other information described herein. The process model descriptions of application systems are known; they can be prepared prior to the application system; they are intended to provide a visualization of processes in the application system itself (for example, tasks, data flow and roles, an example of which is illustrated in FIG. 1), in accordance with process modeling standards. Similarly, objects that are located in process repositories are known, as discussed elsewhere herein.

The processor 1105 may be programmed to determine 1135 which of the configurations 1121, 1123 in a DPHG configuration storage 1117 to use, based on the application system (and possibly other information) included in the help request. The DPHG configuration storage 1117 has configurations 1119; the configurations 1119 store configurations which are specific per application system, here S1 to Sx 1121, 1123. The configurations and their storage is discussed elsewhere herein.

The processor 1105 may be programmed to obtain 1137, from the one of the configurations 1121, 1123, which was determined, in the DPHG configuration storage 1117, configuration information about relations of the repository, process models, and objects of the repository 1125.

The processor 1105 may be programmed to request 1139, from the repository 1125, through the API of the repository 1109, the process models and objects, based on the information obtained from the configuration that was in the DPHG configuration storage 1117. It is possible for the processor 1105 to obtain information about more than one application system, if implicated by the relations regarding the repository 1125. The repository API can return information as usual, using conventional techniques; in at least one embodiment, no special programming need be added to the repository or its API.

The processor 1105 may be programmed to provide 1141 the response to the help request, after having received a response to the request made to the repository. The response to the help request can visually display, for example on the display 1113, the process models provided from the repository 1125, the objects 1129 provided from the repository, and the relations obtained from the DPHG configuration storage. Note that the information included in the response to the help request can be limited to items relevant to the task being currently executed by the user in the application system.

The processor 1105 may be programmed to deliver 1143 the relations, process models and objects to a renderer, which is a convenient way to provide a consistent visual format and to provide a user interface for interacting with the help information to optionally retrieve other relevant information, for example by the repository identifier. The repository identifier is a unique identifier for indicating the object or the process model, which when the repository identifier is selected the corresponding object or process model can be displayed.

The processor 1105 may be programmed with a renderer that will format 1145 a visualization of the relations, the process models and the objects, which is provided to the user, for example, on the display 1113, as the response to the help request.

The processor 1105 may be programmed so that the application system (with the task that is requesting help) to transmit 1147 the help request which, when received 1133, will trigger help. The request incorporates identifications of the repository, the application system, the task, and/or the user. The request can be a single help-link that incorporates the identifications. The help request may be generated by manipulation of a help button or command, for example in response to a user operation of the application system or keyboard 1115.

As will be understood in this field, besides the functions discussed above, the memory 1111 can include other miscellaneous information in a misc. database 1149, along with the usual temporary storage and other instructions for other programs not considered herein.

The computer 1101 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 1105, memory 1111, a disk drive and/or removable storage medium are referred to as "computer-readable storage media" and provide non-transitory storage of computer programs and data.

It should be understood that FIG. 11 is described in connection with logical groupings of functions or resources. One or more of these logical groupings may be performed by different components from one or more embodiments. Likewise, functions may be grouped differently, combined, or augmented without parting from the scope. For example, a computer may be programmed without the renderer 1145; and/or without the application system-help requesting task 1147; or parts of the application system can be omitted from the computer system 1101 and provided on one or more different computer system(s). Similarly the present description may describe various databases or collections of data and information. In some embodiments, the DPHG configuration storage 1117 may be provided remotely from the computer system 1101. One or more groupings of the data or information may be omitted, distributed, combined, or augmented, or provided locally and/or remotely without departing from the scope.

Figure 12:
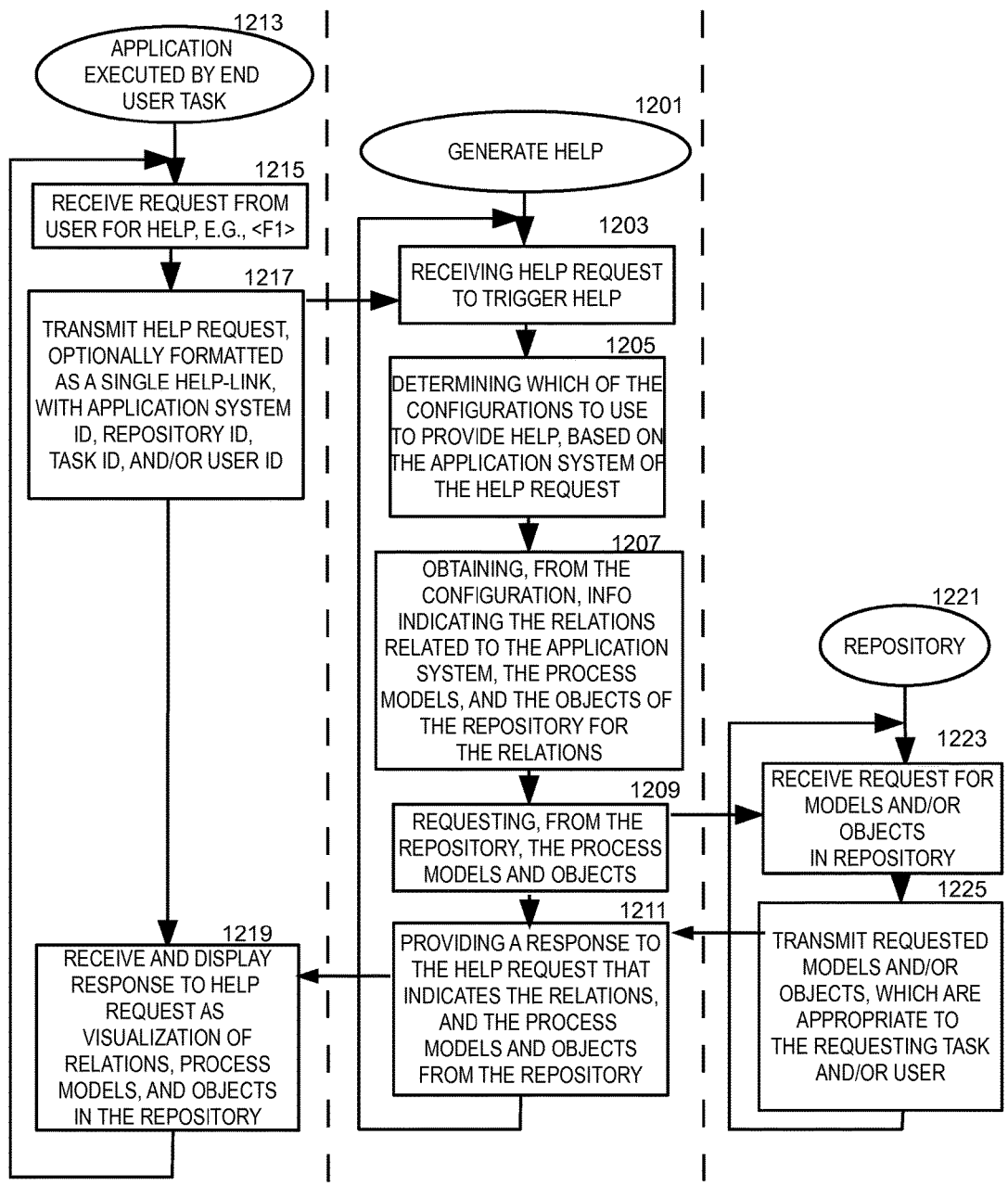
FIG. 12 is a flowchart of a process for generating help.

Referring now to FIG. 12, a flowchart of a process for generating help will be discussed and described. Advantageously, the flowchart of FIG. 12 can be implemented on the computer system of FIG. 11, optionally distributed as discussed herein, or other system similarly structured. FIG. 12 illustrates a process 1213 for the application executed by an end user task, a process 1201 to generate help, and a process 1221 for the repository.

The process 1213 for the application executed by the end user task includes the usual processing of the application, which is not illustrated to avoid obscuring the discussion and will be well understood to someone in this field. At some point, the process 1213 for the application can receive 1215 a request from the user for help, such as a help button, an <F1> key classically associated with a help request, or a selection of a help menu item, similar, or any known technique for a user to request help from the application, or with regard to the particular application. In response to receiving the request from the user for help, such as triggered by the help button or <F1> key, etc., the process 1213 will transmit 1217 a help request with the application system identifier (e.g., identified from the application system that is running), repository identifier (e.g., identified as that associated with the application system), task identifier (e.g., identified from the task that requested help), and/or user identifier (e.g., identified from the user that requested help). The application system identifier, repository identifier, task identifier, and/or user identifier can be obtained in accordance with known techniques. The help request from the process 1213 optionally can be formatted as a help-link, optionally contained in a single help-link, as previously discussed above. The process 1213 can receive 1219 and display the response to the help request as a visualization of relations, process models, and objects in the repository.

The process 1201 to generate help includes receiving 1203 the help request to trigger the help. Then, in response to receiving the help request, the process 1201 to generate help will determine 1205 which of plural configurations to use to provide help. The help request has available to it the application system identifier, the repository identifier, the task identifier, and/or the user identifier. Conveniently, these can be provided in the help request, or possibly can be by the help system in accordance with known techniques. Based on identifiers, which can be included in the help request, the process 1201 determines which of the configurations to use. The process 1201 can obtain 1207, from the one of the configurations which it determined to use. Information that indicates the relations related to the application system, the process models, and the objects of the repository which are relevant to the help request. The process 1201 can request 1209, from the repository, using known techniques, the process models and objects. When the process 1201 receives the process models and objects from the repository, the process 1201 can provide 1211, to the process 1213 that requested the help, a response to the help request that indicates the relations, the process models, and the objects from the repository. The response to the help request that is provided by the process 1201 to generate help can be formatted in a way which is complementary to the formatting expected by the process 1213 that requested the help, for example, as formatted by a rendered discussed in more detail above.

The process 1221 for the repository can receive 1223 request a request for models and/or objects in the repository. In response to such a request, the process 1221 can transmit 1225 the requested models and/or objects to the requestor. Conventional techniques can be used to perform such steps. The models and/or objects which are transmitted can be filtered according to user (for example, by user permissions/restrictions), as is conventional for a repository. The requests/responses between the process 1201 to generate help and the process 1221 for the repository can be performed according to known conventions, such as according to an API provided with the repository.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on transitory or non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and may be merely convenient labels applied to these quantities.

Further, the manipulations performed are often referred to in terms such as determining or requesting, which are commonly associated with mental operations performed by a human operator. While the discussion herein may contemplate the use of a user, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

Terms as used herein are intended to be interpreted primarily as understood to one of skill in the arts of computer science, computer-implemented help systems, and business process management systems as understood by one of skill in computer science, instead of as interpreted according to a non-computer science dictionary or a more general dictionary.

Furthermore, the networks of interest for communicating between computers onto which some embodiments may be distributed include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for generating help from an application system for a process, the method comprising:

receiving, by a processor, a help request to trigger help for a process in response to a user selection of help, wherein an identification of an application system for which help is requested and an identifier of a task for which help is requested are passed as a parameter in the help request that triggers help, wherein the application system for which help is requested is modeled in a repository, wherein a plurality of different application systems are modeled in the repository and the different application systems share a part of connection-relations in the repository, the repository provides an application programming interface (API) that navigates and accesses (i) objects in the repository and (ii) process model definitions in the repository, wherein the process for which help is requested is derived from a process model definition stored in the repository, the repository is accessed through an application programming interface (API), the repository stores, for each application system, the process model definition used to implement the each application system, each process model definition includes relations that define navigation between objects that provide functions in the application system;

determining, by the processor, in response to the help request, which configuration of a plurality of configurations stored in a dynamic process help generator (DPHG) storage to use to provide help, based on the identification of the application system which is passed as the parameter in the help request that triggers help;

obtaining, by the processor, from the determined configuration in the DPHG storage, information indicating (i) the relations of the repository, said relations consisting essentially of relations from which the application system was implemented, and (ii) process models and objects in the repository for said relations;

requesting, by the processor, from the repository through the API of the repository, (i) the process models and the objects consisting of those from which the application system was implemented based on the information obtained from the determined configuration, and (ii) information that indicates how to identify a task which is a current task currently being executed in the application system and how to navigate from the current task to process models consisting essentially of those used by the current task in the application system, wherein the application system was implemented from the relations; and causing the processor to perform navigation through the repository from which the plurality of application systems are modeled, wherein the navigation is limited to (a) the relations and (b) the process models and (c) the objects, which are both specific to the application system which was actually implemented and used by the current task; and providing, by the processor, as a response to the help request, the relations, and the process models and the objects consisting essentially of the relations, the process models, and the objects, from which the application system was implemented and over which the processor navigated as triggered by the help request, which are received by the processor in response to the help request for the application system, wherein the limited navigation starts at a typed-object which is the task for which help is requested, and steps iteratively through the repository via the connection-relations using as input a typed-object which results from a previous step to get a next typed-object in the repository, and results of each of the steps of the limited navigation of the repository are collected and provided as the response to the help request for the process.

2. The method of claim 1, wherein the providing of the response to the help request further comprises delivering, by the processor, to a renderer, the relations, and the process models and the objects which are received by the processor in response to the requesting; and formatting, in the renderer, a visualization of the relations, the process models and the objects, as the response to the user selection of help.

3. The method of claim 1, wherein the repository is a business process repository (BPR) in which a plurality of application systems are stored, and the API provides access to the BPR;

the process models are business process models, and the objects further belong to the business process models.

4. The method of claim 1, wherein the help request received by the processor to trigger help includes the identification of the repository, the application system, and the task for which help is requested in the application system, wherein the configurations stored in the DPHG further describe (i) how to identify, in the repository, the task in the process model used to implement the application system, and (ii) how to navigate between the task and the relations connecting the task to objects in the repository in the process model used to implement the task, and wherein the configuration, which is used to provide help, is based on the task; the process models and the objects, which are requested from the repository, are based on the task; and the response to the help request specifies the process models and the objects based on the task.

5. The method of claim 4, wherein the response provided to the help request, indicates only the relations, and the process models and the objects that are relevant to a combination of the application system and the task.

6. The method of claim 1, wherein the help request received by the processor to trigger help is a single help-link that includes the identification of the repository, the application system, the task for which help is requested in the application system, and a user of the task that generated the help request.

7. The method of claim 1, further comprising creating the help request, by the processor, responsive to a help-request from the task in the application system executing on the processor.

8. The method of claim 1, further comprising when the relations of the application system indicate plural process models and plural objects, receiving the plural process models and the plural objects for the plural process models;

then filtering the plural process models and the plural objects by predetermined type;

wherein the processor provides, as the response to the help request, the relations, and the plural process models and the plural objects as filtered by the predetermined type.

9. A non-transitory computer readable medium comprising executable instructions for performing the method of claim 1.

10. A system that generates help from an application system for a process, the system comprising:

a processor, the processor is configured to receive a help request to trigger help for a process in response to a user selection of help, wherein an identification of an application system for which help is requested and an identifier of a task for which help is requested are passed as a parameter in the help request that triggers help, wherein the application system for which help is requested is modeled in a repository, wherein a plurality of different application systems are modeled in the repository and the different application systems share a part of connection-relations in the repository, the repository provides an application programming interface (API) that navigates and accesses (i) objects in the repository and (ii) process model definitions in the repository, wherein the process for which help is requested is derived from a process model definition stored in the repository, the repository is accessed through an application programming interface (API), the repository stores, for each application system, the process model definition used to implement the each application system, each process model definition includes relations that define navigation between objects that provide functions in the application system;

determine, in response to the help request, which configuration of a plurality of configurations stored in a dynamic process help generator (DPHG) storage to use to provide help, based on the identification of the application system which is passed as the parameter in the help request that triggers help;

obtain, from the determined configuration in the DPHG storage, information indicating (i) the relations of the repository, said relations consisting essentially of relations from which the application system was implemented, and (ii) process models and objects in the repository for said relations;

request, from the repository through the API of the repository, the process models and the objects consisting of those from which the application system was implemented based on the information obtained from the determined configuration, and (ii) information that indicates how to identify a task which is a current task which is currently executed in the application system and how to navigate from the current task to process models consisting essentially of those used by the current task in the application system, wherein the application system was implemented from the relations; and cause the processor to perform navigation through the repository from which the plurality of application systems are modeled, wherein the navigation is limited to (a) the relations and (b) the process models and (c) the objects, which are both specific to the application system which was actually implemented and used by the current task; and provide, as a response to the help request, the relations, and the process models and the objects consisting essentially of the relations, the process models, and the objects, from which the application system was implemented and over which the processor navigated as triggered by the help request, which are received by the processor in response to the help request for the application system, wherein the limited navigation starts at a typed-object which is the task for which help is requested, and steps iteratively through the repository via the connection-relations using as input a typed-object which results from a previous step to get a next typed-object in the repository, and results of each of the steps of the limited navigation of the repository are collected and provided as the response to the help request for the process.

11. The system of claim 10, wherein the processor is further configured, to provide the response, to:
deliver, to a renderer, the relations, and the process models and the objects which are received by the processor in response to the requesting; and
format, in the renderer, a visualization of the relations, the process models and the objects, as the response to the user selection of help.

12. The system of claim 10, wherein
the repository is a business process repository (BPR) in which a plurality of application systems are stored, and the API provides access to the BPR;
the process models are business process models, and the objects further belong to the business process models.

13. The system of claim 10,
wherein the help request that is received to trigger help includes the identification of the repository, the application system, and the task for which help is requested in the application system,
wherein the configurations stored in the DPHG further describe (i) how to identify, in the repository, the task in the process model used to implement the application system, and (ii) how to navigate between the task and the relations connecting the task to objects in the repository in the process model used to implement the task, and
wherein the configuration, which is used to provide help, is based on the task; and the process models and the objects, which are requested from the repository, are based on the task; and the response to the help request specifies the process models and the objects based on the task.

14. The system of claim 13, wherein the response provided to the help request, indicates only the relations, and the process models and the objects that are relevant to a combination of the application system and the task.

15. The system of claim 10, wherein the help request that is received to trigger help is a single help-link that includes the identification of the repository, the application system, the task for which help is requested in the application system, and a user of the task that generated the help request.

16. The system of claim 10, wherein the processor is further configured to create the help request, responsive to a help-request from the task in the application system.

17. The system of claim 10, wherein the processor is further configured to
when the relations of the application system indicate plural process models and plural objects, receive the plural process models and the plural objects for the plural process models;
wherein the response provided to the help request, indicates the relations, and the plural process models and the plural objects.

18. The system of claim 17, wherein the processor is further configured to filter the plural process models and the plural objects by predetermined type;
wherein the response, provided to the help request, indicates only the relations, and the plural process models and the plural objects that are relevant to a combination of the application system, the task, the predetermined type, and the user.

19. A method for generating help from an application system for a process, the method comprising:
transmitting, by a processor, a help request to trigger help for a process in response to a user selection of help, wherein an identification of an application system for which help is requested and an identifier of a task for which help is requested are passed as a parameter in the help request that triggers help, wherein the application system for which help is requested is modeled in a repository, wherein a plurality of different application systems are modeled in the repository and the different application systems share a part of connection-relations in the repository, wherein the repository provides an application programming interface (API) that navigates and accesses (i) objects in the repository and (ii) process model definitions in the repository, wherein the process for which help is requested is derived from a process model definition stored in the repository, the repository is accessed through an application programming interface (API), the repository stores, for each application system, the process model definition used to implement the each application system, each process model definition includes relations that define navigation between objects that provide functions in the application system;
wherein the help request to trigger help is a single help-link that includes the identification of the repository, the application system, and the task for which help is requested, the task being in the process model used to implement the application system, and
receiving, by the processor, a response to the help request, wherein the response includes the relations, the process models, and the objects consisting essentially of the relations, the process models, and the objects, contained in the repository from which the application system was modeled and which are both specific to the application system which was actually implemented and used by the task being currently executed in the application system,
wherein the response to the help request for the process includes results of each of steps of limited navigation through the repository starting at a typed-object which is the task for which help is requested, stepping iteratively through the repository via the connection-relations using as input a typed-object which results from a previous step to get a next typed-object in the repository.

20. The method of claim 19, further comprising
rendering, by the processor, using the API, a visualization of the relations, the process models, and the objects received in the response to the help request;
providing, by the processor, as the response to the user selection of help, a display of the visualization rendered of the relations, the process models and the objects contained in the repository which are limited to a combination of the application system, and the task.

* * * * *